US008745222B2

(12) United States Patent
Chi et al.

(10) Patent No.: US 8,745,222 B2

(45) Date of Patent: Jun. 3, 2014

(54) CONTENT SYSTEM AND ASSOCIATED METHODS

(75) Inventors: Timothy Rotau Chi, Cambridge, MA (US); Daniel Cane, Washington, DC (US); Lara Oerter, Washington, DC (US); Jessica Finnefrock, Alexandria, VA (US); Deborah Everhart, Washington, DC (US); Michael Lewis Chasen, Chevy Chase, MD (US)

(73) Assignee: Blackboard Inc., Washington, DC (US)

( * ) Notice: Subject to any disclaimer, the term of this patent is extended or adjusted under 35 U.S.C. 154(b) by 1234 days.

(21) Appl. No.: 10/918,016

(22) Filed: Aug. 13, 2004

(65) Prior Publication Data

US 2005/0086296 A1 Apr. 21, 2005

Related U.S. Application Data

(60) Provisional application No. 60/495,694, filed on Aug. 15, 2003, provisional application No. 60/600,199, filed on Aug. 10, 2004.

(51) Int. Cl.

| | |
|---|---|
| ***G06F 3/00*** | (2006.01) |
| ***G06F 15/16*** | (2006.01) |
| ***G06F 15/173*** | (2006.01) |
| ***G06Q 10/00*** | (2012.01) |

(52) U.S. Cl.

USPC .......... 709/225; 709/204; 709/218; 705/7.13; 715/751; 715/753

(58) Field of Classification Search

USPC .......... 709/204, 218, 225; 705/7.13; 715/751, 715/753

See application file for complete search history.

(56) References Cited

U.S. PATENT DOCUMENTS

| | | | |
|---|---|---|---|
| 4,236,209 | A | 11/1980 | Lombardo et al. |
| 4,724,521 | A | 2/1988 | Carron et al. |
| 4,727,589 | A | 2/1988 | Hirose et al. |
| 4,935,870 | A | 6/1990 | Burk, Jr. et al. |
| 5,002,491 | A | 3/1991 | Abrahamson et al. |
| 5,263,869 | A | 11/1993 | Ziv-El |
| 5,434,913 | A | 7/1995 | Tung et al. |
| 5,437,555 | A | 8/1995 | Ziv-El |

(Continued)

FOREIGN PATENT DOCUMENTS

WO WO-02/27458 A1 4/2002

OTHER PUBLICATIONS

U.S. Appl. No. 09/608,208, filed Jun. 30, 2000, filed Cane et al.

(Continued)

*Primary Examiner* — Aaron Strange

(74) *Attorney, Agent, or Firm* — McDermott Will & Emery LLP

(57) ABSTRACT

A method and system are disclosed for providing data files to a community of users. The data files relate to a plurality of courses. Each user is associated with one or more of the courses. The system includes client devices operated by the users and a server system in communication with the client devices over a network. The server system provides to the client devices access to data files relating to courses with which the users are associated. The server system also includes a content system for storing content items from users. The content items in the content system are selectable by users for inclusion in one or more of the plurality of data files.

47 Claims, 22 Drawing Sheets

(56) References Cited

U.S. PATENT DOCUMENTS 5,441,415 A 8/1995 Lee et al.
5,490,247 A 2/1996 Tung et al.
5,515,296 A 5/1996 Agarwat
5,537,141 A 7/1996 Harper et al.
5,664,126 A 9/1997 Hirakawa et al.
5,694,601 A 12/1997 White
5,727,950 A 3/1998 Cook et al.
5,734,828 A 3/1998 Pendse et al.
5,764,900 A 6/1998 Morris et al.
5,764,901 A 6/1998 Skarbo et al.
5,768,510 A 6/1998 Gish
5,778,367 A 7/1998 Wesinger et al.
5,778,368 A 7/1998 Hogan et al.
5,787,247 A 7/1998 Norin et al.
5,793,967 A 8/1998 Simciak et al.
5,799,150 A 8/1998 Hamilton et al.
5,810,605 A 9/1998 Siefert
5,812,668 A * 9/1998 Weber ..................... 705/79
5,812,776 A 9/1998 Gifford
5,815,659 A 9/1998 Umetsu et al.
5,815,664 A 9/1998 Asano
5,819,047 A * 10/1998 Bauer et al. ............... 709/229
5,835,911 A 11/1998 Nakagawa et al.
5,848,239 A 12/1998 Ando
5,848,246 A 12/1998 Gish
5,859,971 A 1/1999 Bittinger et al.
5,870,559 A * 2/1999 Leshem et al. ............ 709/224
5,878,233 A 3/1999 Schloss
5,890,162 A 3/1999 Huckins
5,896,533 A 4/1999 Ramos et al.
5,903,727 A 5/1999 Nielsen
5,905,866 A 5/1999 Nakabayashi et al.
5,909,589 A 6/1999 Parker et al.
5,918,010 A 6/1999 Appleman et al.
5,918,012 A 6/1999 Astiz et al.
5,931,908 A 8/1999 Gerba et al.
5,933,841 A 8/1999 Schumacher et al.
5,937,163 A 8/1999 Lee et al.
5,946,699 A 8/1999 Sawashima et al.
5,949,492 A 9/1999 Makovitz
5,956,485 A 9/1999 Periman
5,964,832 A 10/1999 Kisor
5,973,683 A 10/1999 Cragun et al.
5,983,199 A 11/1999 Kaneko
5,987,510 A 11/1999 Imai et al.
5,999,975 A 12/1999 Kittaka et al.
6,006,018 A 12/1999 Burnett et al.
6,006,251 A 12/1999 Toyouchi et al.
6,006,279 A 12/1999 Hayes
6,012,083 A 1/2000 Savitzky et al.
6,012,098 A 1/2000 Bayeh et al.
6,014,695 A 1/2000 Yamashita et al.
6,016,500 A 1/2000 Waldo et al.
6,023,724 A 2/2000 Bhatia
6,023,765 A 2/2000 Kuhn
6,026,402 A 2/2000 Vossen et al.
6,026,430 A 2/2000 Butman et al.
6,035,330 A 3/2000 Astiz et al.
6,038,590 A 3/2000 Gish
6,047,313 A 4/2000 Hashimoto et al.
6,049,826 A 4/2000 Beser
6,052,730 A 4/2000 Felciano et al.
6,055,512 A 4/2000 Dean et al.
6,058,394 A 5/2000 Bakow
6,058,421 A 5/2000 Fijolek et al.
6,064,856 A * 5/2000 Lee et al. .................. 434/350
6,065,038 A 5/2000 Chen
6,070,185 A 5/2000 Anupam et al.
6,078,914 A * 6/2000 Redfern ...................... 707/3
6,088,679 A 7/2000 Barkley
6,144,402 A * 11/2000 Norsworthy et al. ......... 725/109
6,149,441 A * 11/2000 Pellegrino et al. ........... 434/350
6,161,139 A 12/2000 Win et al.
6,175,841 B1 1/2001 Loiacono
6,199,099 B1 3/2001 Gershman et al.
6,201,948 B1 * 3/2001 Cook et al. .................. 434/350
6,202,066 B1 3/2001 Barkley et al.
6,261,103 B1 7/2001 Stephens et al.
6,289,512 B1 9/2001 Edwards et al.
6,301,462 B1 10/2001 Freeman et al.
6,302,698 B1 10/2001 Ziv-El
6,334,141 B1 12/2001 Varma et al.
6,338,086 B1 1/2002 Curtis et al.
6,347,333 B2 2/2002 Eisendrath et al.
6,351,777 B1 2/2002 Simonoff
6,357,010 B1 3/2002 Viets et al.
6,381,579 B1 4/2002 Gervais et al.
6,411,796 B1 6/2002 Remschel
6,427,063 B1 7/2002 Cook et al.
6,442,574 B1 8/2002 Schumacher et al.
6,453,353 B1 9/2002 Win et al.
6,463,460 B1 10/2002 Simonoff
6,470,171 B1 10/2002 Helmick et al.
6,484,156 B1 11/2002 Gupta et al.
6,505,031 B1 * 1/2003 Slider et al. ................. 434/350
6,546,230 B1 4/2003 Allison
6,557,100 B1 4/2003 Knutson
6,789,110 B1 * 9/2004 Short et al. .................. 709/221
6,965,752 B2 * 11/2005 Allen et al. .................. 434/362
2001/0037379 A1 11/2001 Livnat
2002/0032784 A1 3/2002 Darago et al.
2002/0115052 A1 * 8/2002 Anderson et al. ............ 434/350
2002/0184401 A1 12/2002 Kadel et al.
2002/0184610 A1 12/2002 Chong et al.
2003/0129573 A1 * 7/2003 Bowers et al. ............... 434/350
2003/0158953 A1 * 8/2003 Lal ................................ 709/230
2004/0030781 A1 2/2004 Etesse et al.
2004/0167822 A1 8/2004 Chasen et al.
2004/0267827 A1 * 12/2004 Chang et al. ................. 707/200

OTHER PUBLICATIONS

Gill, D., "Online Learning in the Off Hours", Business Week, (Dec. 1997).

Panettieri, Joseph D., "Can ePortfolios Connect? These Five Smart Steps Can Help You Navigate Perilous ePortfolio Territory" , University Business Daily (Online Edition).

Jastrow, David, "CBT Systems Roll Out New Training Pack for Microsoft" Computer Reseller News, (Dec. 1997).

Menefee, Sami, "Using the Internet to Advance Education", Newsbytes News Network, (Dec. 1997).

S.D. Benford, E.K. Burke, E. Foxley, N. Gutteridge, A. Mohd Zin, The Design Document for Ceilidh Ver. 2, Learning Technology Research Computer Science Department, Univ. of Nottingham, UK, Revision 3.2, 30 pages.

S.D. Benford, E.K. Burke, E. Foxley, Developer's Guide to Ceilidh, Learning Technology Research Computer Science Department, Univ. of Nottingham, UK, Revision for Ceilidh 3.4, 43 pages.

S.D. Benford, A.N. Bullock, E.K. Burke, E. Foxley, C.A. Gibbon, N. Gutteridge, C. Higgins, A. Mohd Zin, Installer's Guide to Ceilidh (2.6), Learning Technology Research Computer Science Department, Univ. of Nottingham, UK, Revision for Ceilidh 2.6, 18 pages.

S. Benford, E. Burke, E. Foxley, N. Gutteridge, A.M. Zin, The Ceilidh System, Learning Technology Research Computer Science Department, Univ. of Nottingham, UK, Revision 3.2, 7 pages.

S.D. Benford, E.K. Burke, E. Foxley, Student's Guide to Ceilidh, Ver. 2.5, Learning Technology Research Computer Science Department, Univ. of Nottingham, UK, Revision 3.2, 17 pages.

S.D. Benford, E.K. Burke, E. Foxley, Teacher's Guide to Ceilidh, Ver. 2.7, Learning Technology Research Computer Science Department, Univ. of Nottingham, UK, Revision 2.7, 16 pages.

E. Foxley, User Guide to Interactive WWW Ceilidh, provisional version 23, Sep. 1995-1996, www.cs.nott.ac.uk, 4 pages.

1997 The Daedalus Group, Inc., Austin, Texas, Integrated Writing Environment for Windows Computers, Version 5.3x, Instructor's Guide, 86 pages.

1997 The Daedalus Group, Inc., Austin, Texas, Integrated Writing Environment for Windows Computers, Version 5.3x, User's Guide, 81 pages.

(56) References Cited

OTHER PUBLICATIONS

1997 The Daedalus Group, Inc., Austin, Texas, Integrated Writing Environment for Windows Computers, Version 5.3x, Administrator's Guide, 73 pages.

1997 by SoftArc Inc., Using the FirstClass Intranet Client, 303 pages.

1997 by SoftArc Inc., User Reference Card, 6 pages.

Panettieri, Joseph D., "Can ePortfolios Connect? These Five Smart Steps Can Help You Navigate Perilous ePortfolio Territory", University Business Daily (Online Edition).

"Unicode and the Web." www.iath.virginia.edu/babble/uniweb.html.

"Unicode, An Overview.", Basis Technology, (2002) www.basistech.com/papers/Unicode/overview.html.

"Universal Chacter Set." Wikipedia: The Free Encyclopedia (Jun. 2003).

Office Action dated Mar. 25, 2008, U.S. Appl. No. 90/008,330.

Response to Office Action dated May 27, 2008.

Comments by Third Party Requestor to Patent Owner's Response in Inter Partes Reexamination Under 37 C.F.R. § 1.947 dated Jun. 26, 2008.

Office Action dated Sep. 17, 2008, U.S. Appl. No. 11/648,096.

* cited by examiner

UNIVERSITY

Home Help Logout

| My Institution | Courses | Community | My Library | My Content Activities | Institutional Library | My Course Libraries |

Welcome, Michael

Tools
- Announcements
- Calendar
- Tasks
- View Grades
- Send E-mail
- User Directory
- Address Book
- My Library
- Course Libraries
- Institutional Library
- My Content Activities

My Library [Contents] [Layout]

⬜ Go To My Library  ⬜ Web Folder

Summary Stats
12 New Items (Last 7 days)
Quota                60 MB
Total Size           23.6 MB
Available            36.4 MB

Activities
- 3 Reminder Items

Bookmarks
- Course Files
- Arthurian Legends Syllabus
- Student Portfolios
- My Content
- Department Folder

My Course Content Activites

Courses you are teaching:
- Arms and Armor
  - 26 Student items to grade
  - 4 TA items to approve
  - 1 Dean's items to review
- Arthurian Legends
  - 3 e-Reserve items to approve
  - 24 Library items to approve
- ARTHURIAN LIN:500-1500 Spring 2003
  - No Items
- Cadbury and Medieval Warfare
  - 10 Student items to grade Courses in which you are enrolled:
- English Instructors Collaboratory
  - 4 instructor items to review

Courses: Quick View

Courses in which you are enrolled:
- English Instructors Collaboratory

Courses you are teaching:
- Arms and Armor
- Arthurian Legends
- ARTHURIAN LIN:500-1500 Spring 2003
- Cadbury and Medieval Warfare

My Organization Content Activites

Organizations which you are managing:
- Medieval Literature Lounge
  - 7 Member items to review
  - 13 Library items to approve

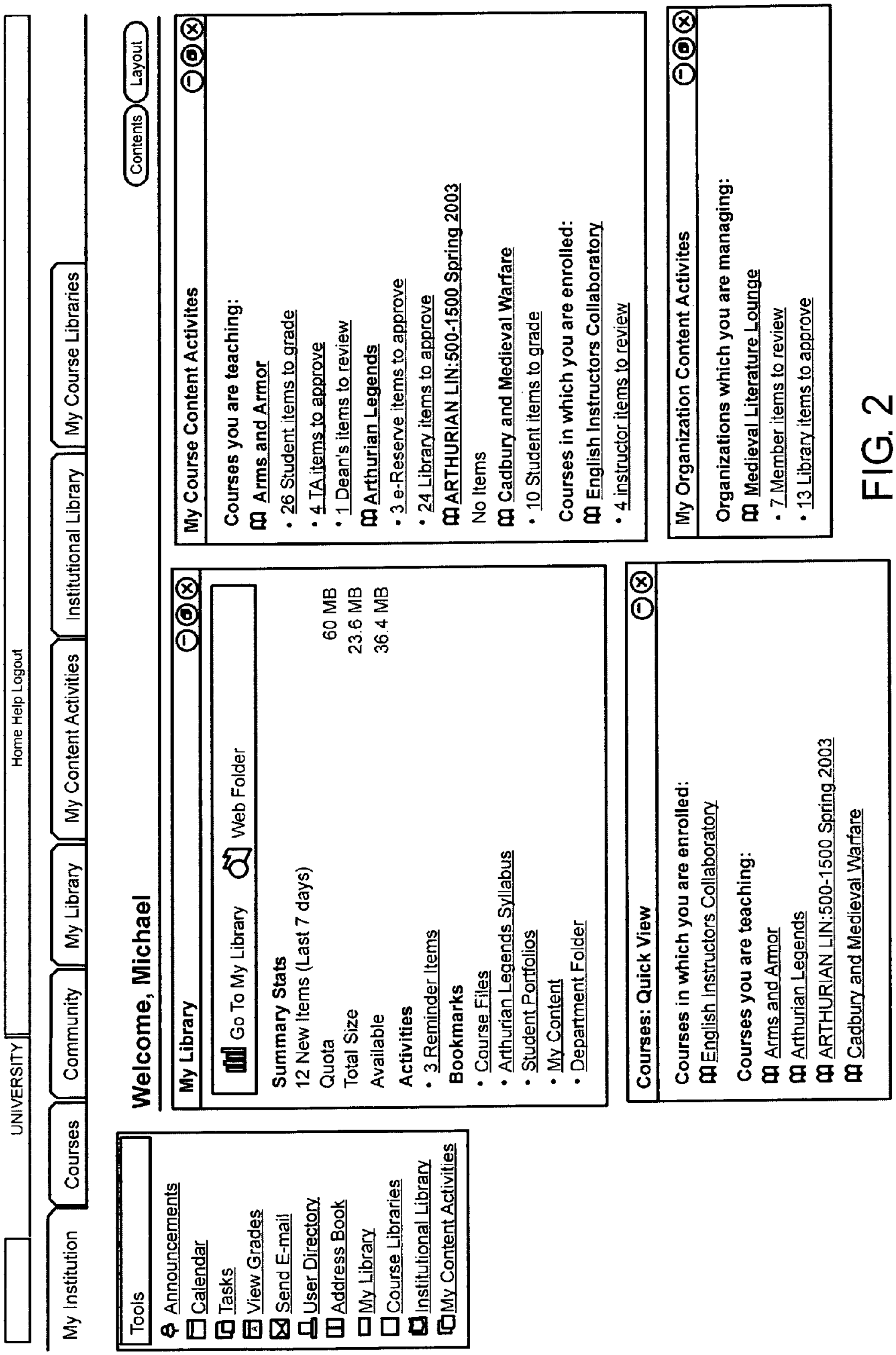

FIG. 2

① Content Information

Search From: [/dyaskin] <browse>

Fill in at least one of the following criteria

File Name: [Equals ▼] [_____]

and Size: [Equal To ▼] [_____]

and User Actions: [Created By ▼] [_____]

and Dates: [Created On ▼] [On ▼] [D ▼] [M ▼] [Y ▼]

and Contains: [_____]

and Meta Data:
  Name: [Equals ▼]
  Value: [_____]

② Save Search

To save your search, check the "Yes" below and enter the name of the search in the field provided Save search:   Yes ●   No ○

Save This Search As: [_____]

③ Submit

Click "Submit" to finish. Click "Cancel" to abort this process.

(Cancel)  (Submit)

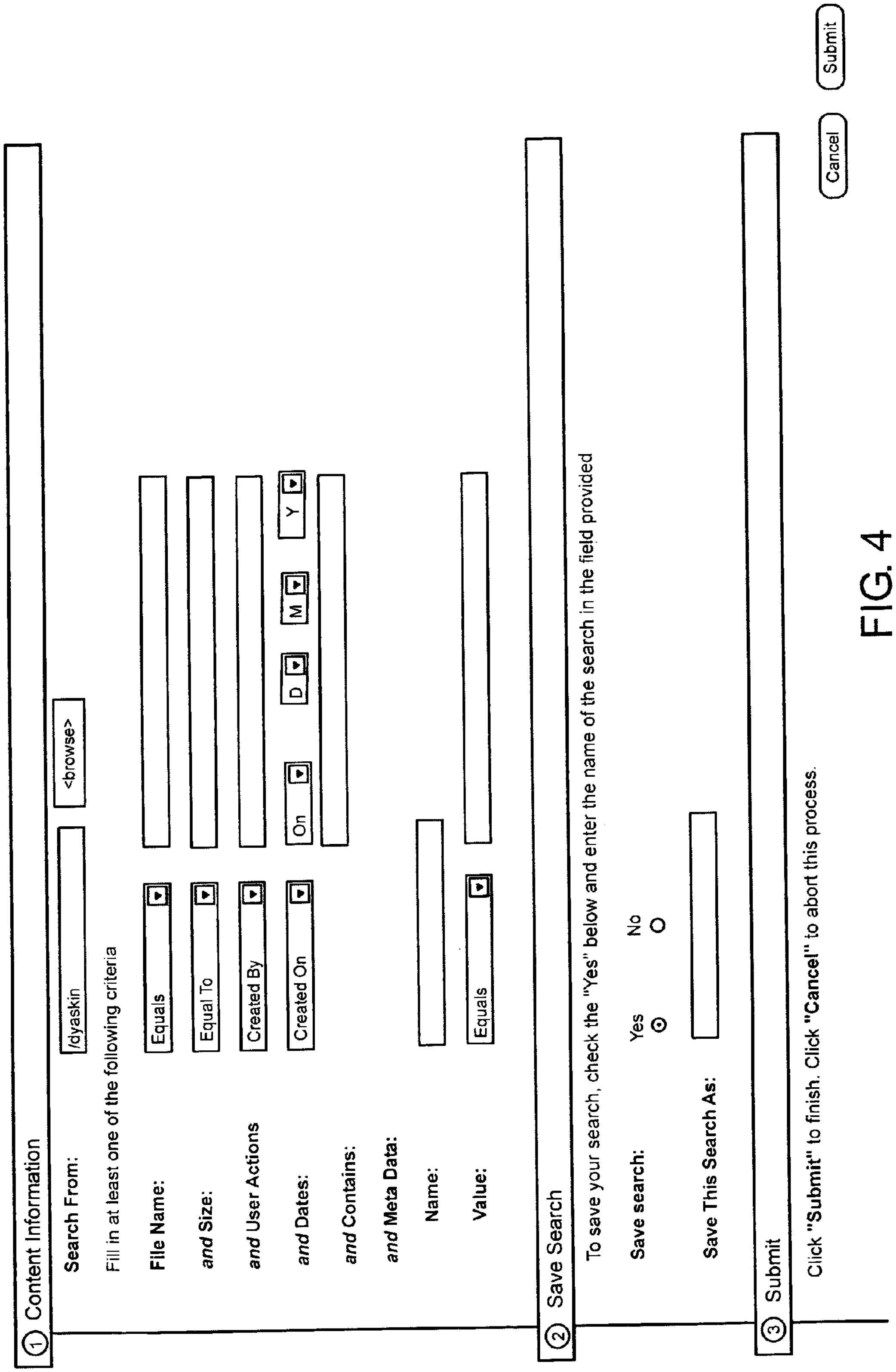

FIG. 4

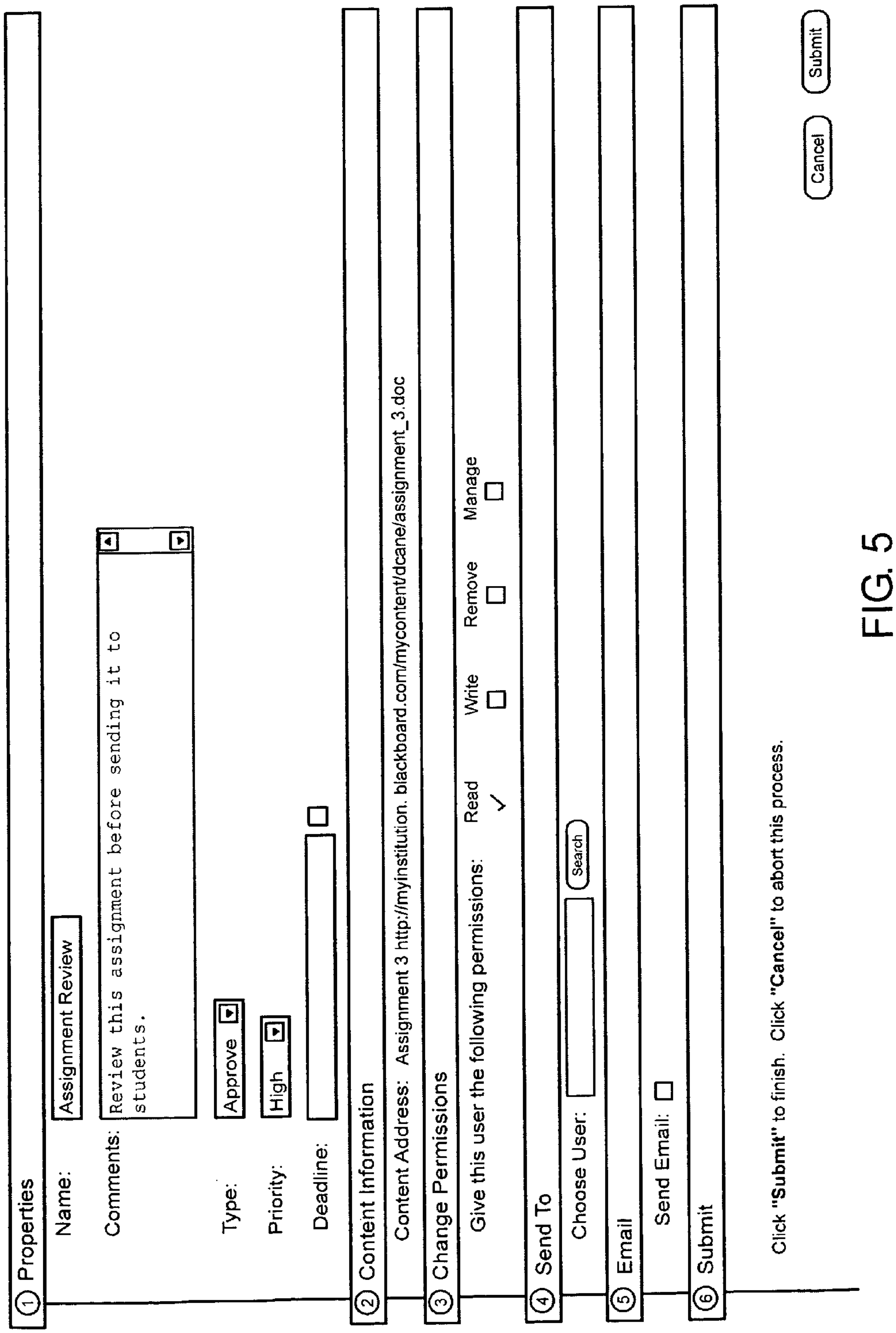

FIG. 5

① Properties

Name: [Assignment Review]

Comments: [Review this assignment before sending it to students.]

Type: [Approve ▼]

Priority: [High ▼]

Deadline: [ ]

② Content Information

Content Address: Assignment 3 http://myinstitution.blackboard.com/mycontent/dcane/assignment_3.doc

③ Change Permissions

Give this user the following permissions:

| Read | Write | Remove | Manage |
|------|-------|--------|--------|
| ✓ | ☐ | ☐ | ☐ |

④ Send To

Choose User: [ ] (Search)

⑤ Email

Send Email: ☐

⑥ Submit

Click "Submit" to finish. Click "Cancel" to abort this process.

(Cancel) (Submit)

Manage Workflow Activities

☑ Add Workflow  ☒ Remove

| Name | To/From | Type | Deadline | |
|---|---|---|---|---|
| Chivalry.doc | Dan Cane | Approve | 4/21/03 9:31:19 PM EST | Manage |
| FinalReport.doc | Deb Everhart | Grade | 4/16/03 2:32:00 PM EST | Respond |
| films.html | Mike Lewis | Approve | 3/24/03 9:37:13 AM EST | Respond |
| Glastonbury presentation.ppt | Dan Cane | Reminder | 3/17/03 9:10:02 PM EST | Manage |
| GroupActivitiesTracking.xls | Dan Cane | Approve | 3/03/03 8:08:57 AM EST | Manage |
| group projects.doc | Dan Cane | Grade | 2/24/03 9:41:43 AM EST | Manage |
| homework ch3.doc | Mike Lewis | Grade | 1/17/03 3:15:37 PM EST | Respond |
| survey.doc | Dan Cane | Reminder | 1/17/03 3:13:18 PM EST | Manage |
| syllabus.doc | Dan Cane | Approve | 12/13/02 4:36:23 PM EST | Manage |

( OK )

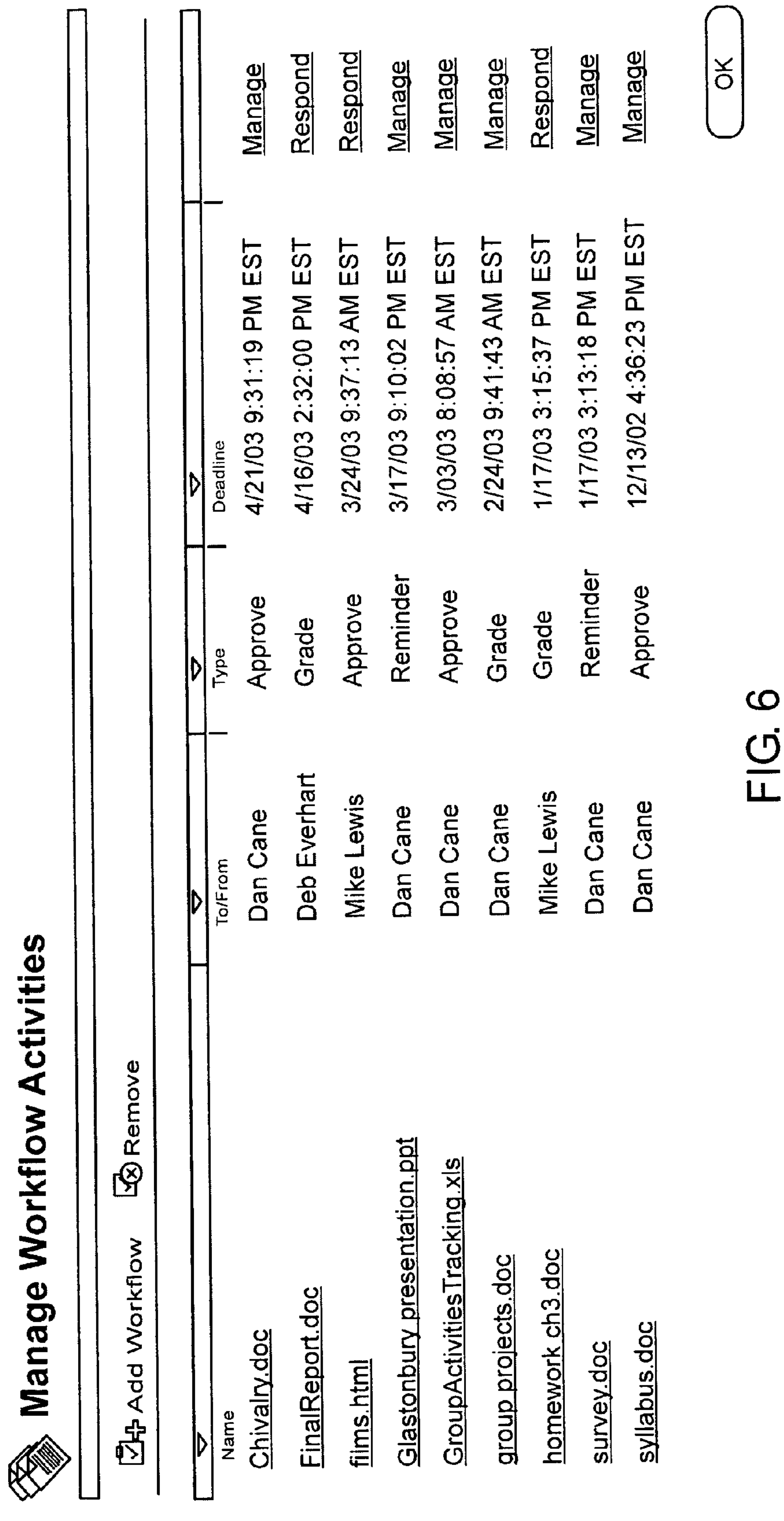

FIG. 6

Manage Permissions: syllabus.doc

+ Add User List    ⊗ Remove

| User List | Read | Write | Remove | Manage | |
|---|---|---|---|---|---|
| ☑ Department | ✓ | | | | Modify |
| ☐ Faculty | | | | | Modify |
| ☐ Guest | ✓ | | | | Modify |
| ☑ John Doe | ✓ | ✓ | ✓ | | Modify |
| ☑ Owner | ✓ | | | | Modify |
| ☐ Students | ✓ | | | | Modify |
| ☐ System Administrator | ✓ | ✓ | ✓ | ✓ | Modify |
| ☑ TA's | ✓ | ✓ | ✓ | | Modify |
| ☐ Zack Lewis | ✓ | | | | Modify |

OK

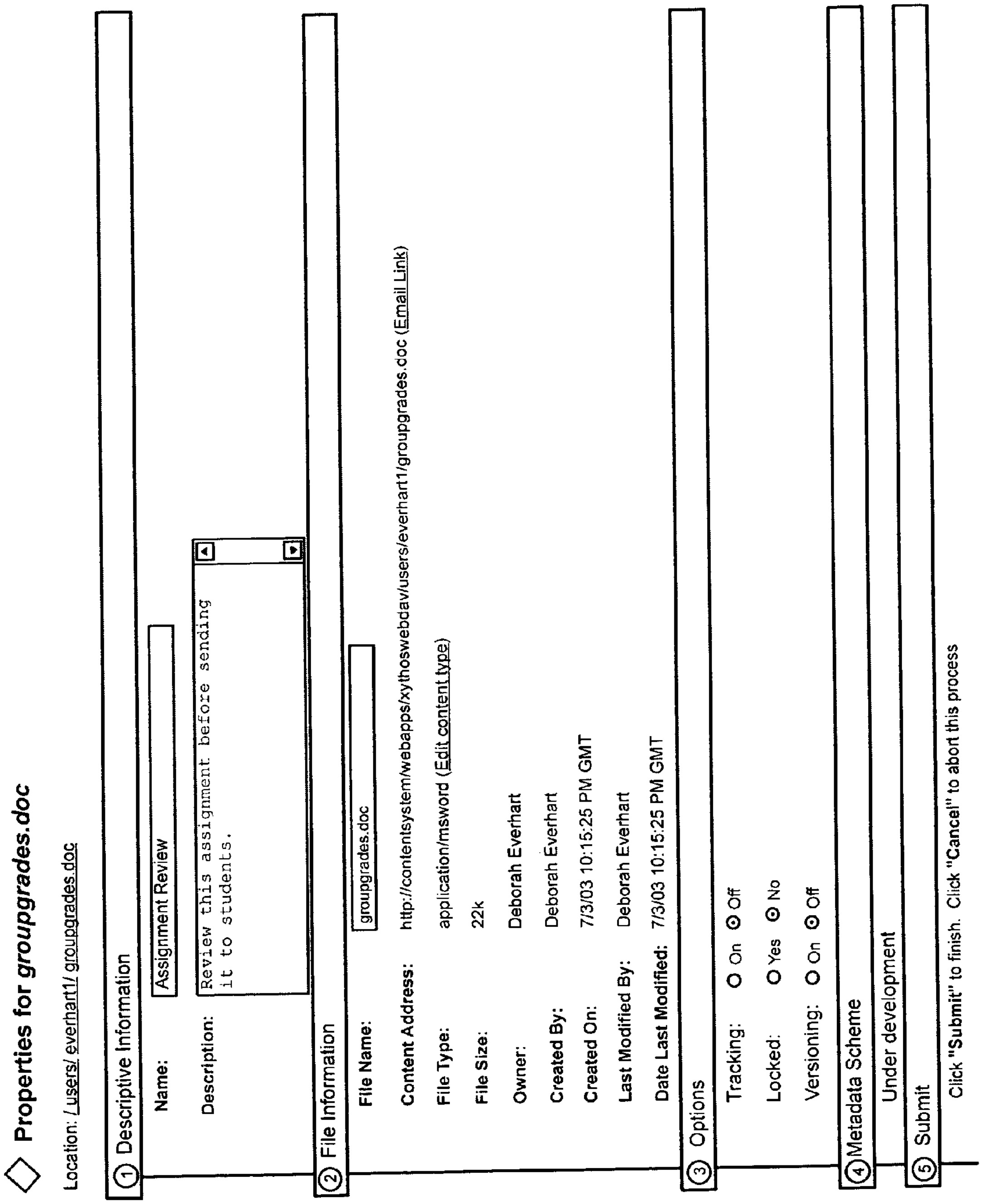

FIG. 10

◇ **Properties for *groupgrades.doc***

Location: /users/ everhart1/ groupgrades.doc

① Descriptive Information

Name: [Assignment Review]

Description: Review this assignment before sending it to students.

② File Information

File Name: [groupgrades.doc]

Content Address: http://contentsystem/webapps/xythoswebdav/users/everhart1/groupgrades.doc (Email Link)

File Type: application/msword (Edit content type)

File Size: 22k

Owner: Deborah Everhart

Created By: Deborah Everhart

Created On: 7/3/03 10:15:25 PM GMT

Last Modified By: Deborah Everhart

Date Last Modified: 7/3/03 10:15:25 PM GMT

③ Options

Tracking:  ○ On  ⊙ Off

Locked:    ○ Yes ⊙ No

Versioning: ○ On ⊙ Off

④ Metadata Scheme

Under development

⑤ Submit

Click "Submit" to finish. Click "Cancel" to abort this process

Manage Versions: syllabus.doc

Copy  Remove

| | Version | Last Modified Date | Last Modified By | Size | Check in | Roll Back |
|---|---|---|---|---|---|---|
| ☑ | Version 9 | 4/21/03 9:31:19 PM EST | Dan Cane | 42.1 K | | |
| ☐ | Version 8 | 4/16/03 2:32:00 PM EST | Dan Cane | 42.1 K | | |
| ☐ | Version 7 | 3/24/03 9:37:13 AM EST | Mike Lewis | 37.8 K | | |
| ☑ | Version 6 | 3/17/03 9:10:02 PM EST | Dan Cane | 40.6 K | | |
| ☑ | Version 5 | 3/03/03 8:08:57 AM EST | Dan Cane | 37.8 K | | |
| ☐ | Version 4 | 2/24/03 9:41:43 AM EST | Deb Everhart | 28.3 K | | |
| ☐ | Version 3 | 1/17/03 3:15:37 PM EST | Mike Lewis | 21.1 K | | |
| ☑ | Version 2 | 1/17/03 3:13:18 PM EST | Dan Cane | 24.9 K | | |
| ☐ | Version 1 | 12/13/02 4:36:23 PM EST | Dan Cane | 10.2 K | | |

OK

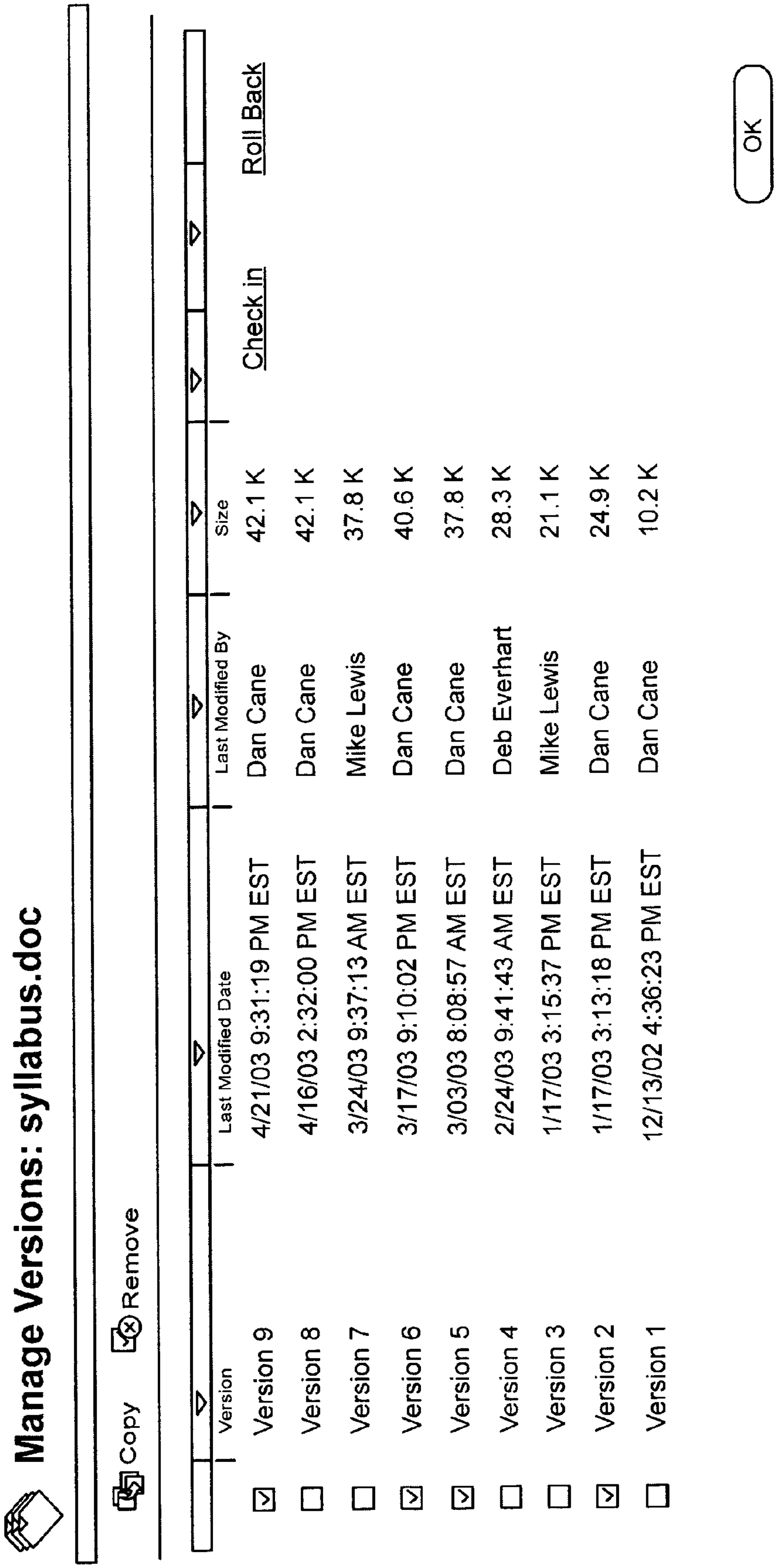

FIG. 11

Tracking: syllabus.doc

| Name | Action | Version | Date/Time | IP Address To/From |
|---|---|---|---|---|
| Dan Cane | Logging Enabled | | 12/13/02 4:36:23 PM EST | 10.8.60.16 |
| Dan Cane | New Comment | | 1/17/03 3:13:18 PM EST | 10.8.60.16 |
| Mike Lewis | Read | 2 | 1/17/03 3:15:37 PM EST | 10.8.60.16 |
| John Doe | Copy To | 2 | 2/24/03 3:41:43 AM EST | 10.8.60.16/idoe/syllabus.doc |
| Deb Everhart | Read | 3 | 3/03/03 8:08:57 AM EST | 10.8.60.16 |
| Deb Everhart | Write | 4 | 3/17/03 9:10:02 PM EST | 10.8.60.16 |
| Mike Lewis | New Comment | | 3/24/03 9:37:13 AM EST | 10.8.60.16 |
| Dand Cane | Read | 3 | 4/16/03 2:32:00 PM EST | 10.8.60.16 |
| Mike Lewis | Write | 4 | 4/21/03 9:31:19 PM EST | 10.8.60.16 |

Blackboard

LISA SMITH

- Home
- Career Goals
- Education
- Class Projects
- Campus Activities
- Honors & Awards
- Work Experience
- Volunteer Work
- Contact Me

Welcome to My Online Portfolio

Currently a senior at Armer University, I will graduate this spring with a double major in Political Science and Economics. Throughout my four years of study, I have taken advantage of Armer University's location in Washington, DC by completing a number of internships. This work experience has allowed me to apply the lessons from my courses to real world problems in International Economic Development.

Please take some time to review my portfolio.

It will show you the accumulation of my experiences over the past few years, including:
- My senior thesis on micro lending practices in Latin America
- A group project on political reform in India that resulted in a department award for excellence and the opportunity to present at a conference sponsored by the World Bank
- Highlights from course work during my semester abroad in Chile
- Overview of my internships at the US Trade Representatives' Office and the Organization of American States Regards,
Lisa Smith

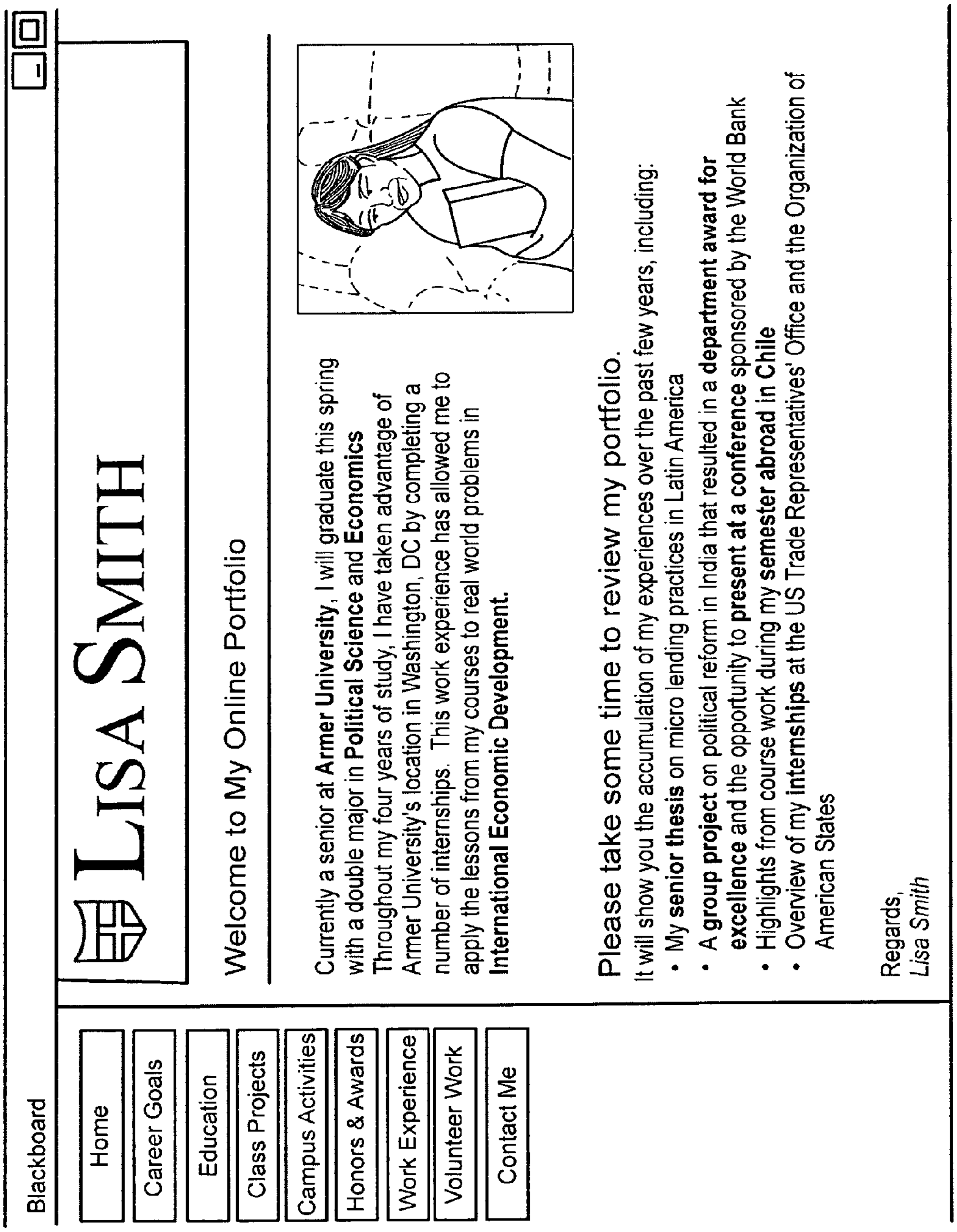

FIG. 13

① Descriptive Information

Name:

Description:

② File Information

File: [Browse]

Overwrite file if it already exists: ☐

③ Options

Tracking: ○ On ⊙ Off

Locked: ○ Yes ⊙ No

Versioning: ○ On ⊙ Off

④ Metadata Scheme

Under development

⑤ Submit

Click "Submit" to finish. Click "Cancel" to abort this process

[Cancel] [Submit]

84

80

82

CONTENT SYSTEM AND ASSOCIATED METHODS

RELATED APPLICATIONS

The present application is based on and claims priority from U.S. provisional patent application Ser. No. 60/495,694 filed on Aug. 15, 2003 and entitled "CONTENT SYSTEM AND ASSOCIATED METHODS," which is incorporated by reference herein in its entirety. The present application is also based on and claims priority from U.S. provisional patent application Ser. No. 60/600,199 filed on Aug. 10, 2004 and entitled "CONTENT SYSTEM AND ASSOCIATED METHODS," which is also incorporated by reference herein in its entirety.

FIELD OF THE INVENTION

The present application relates generally to networks for exchanging information among persons in a community and, more particularly, to networks for exchanging information between instructors and students in an educational setting.

BACKGROUND OF THE INVENTION

In educational settings, electronic networks are often used for exchanging information between instructors and students. Instructors can interact with one or more students by transmitting course lectures, literature, and other course materials, receiving student questions and input, and conducting participatory class discussions and examinations over networks such as local area networks and the Internet.

BRIEF SUMMARY OF EMBODIMENTS OF THE INVENTION

In accordance with one or more embodiments of the invention, a method and system are disclosed for providing data files to a community of users. The data files relate to a plurality of courses. Each user is associated with one or more of the courses. The system includes client devices operated by the users and a server system in communication with the client devices over a network. The server system provides to the client devices access to data files relating to courses with which the users are associated. The server system also includes a content system for storing content items from users. The content items in the content system are selectable by users for inclusion in one or more of the plurality of data files.

These and other features will become readily apparent from the following detailed description wherein embodiments of the invention are shown and described by way of illustration. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

BRIEF DESCRIPTION OF THE DRAWINGS

FIG. 2 is an exemplary screenshot of a university portal from which the content system can be accessed;

FIG. 4 is an exemplary screenshot illustrating searching for content items in the content system in accordance with one or more embodiments of the invention;

FIG. 5 is an exemplary screenshot of a workflow page for transferring content in accordance with one or more embodiments of the invention;

FIG. 6 is an exemplary screenshot of a page for managing workflow activities in accordance with one or more embodiments of the invention;

FIG. 10 is an exemplary screenshot illustrating the setting of properties for added content in accordance with one or more embodiments of the invention;

FIG. 11 is an exemplary screenshot illustrating management of versions of a document or file in accordance with one or more embodiments of the invention;

FIG. 12 is an exemplary screenshot illustrating file tracking in accordance with one or more embodiments of the invention.

FIG. 13 is an exemplary screenshot of a student portfolio;

DETAILED DESCRIPTION OF PREFERRED EMBODIMENTS

The present invention is generally directed to a content system for use in the exchange of information by a community of persons over an electronic network such as, e.g., a local area network (LAN), a wide area network (WAN), a metropolitan area network (MAN), intranets, the Internet and/or the World Wide Web. The users of the content system can be persons associated with an organization such as, e.g., students and faculty at a college or employees of a corporate organization or other business. The content system is particularly suited for use in a university or college campus environment as illustrated in some of the examples described herein. It should, however, be understood that content systems in accordance with various embodiments of the invention can be implemented in various other organization and community settings, including, e.g., in other educational organizations such as K-12 schools, corporate and other business entities, and governmental institutions.

As described below, in an educational setting, the content system in accordance with one or more embodiments of the invention can allow faculty, instructors, and students and others to share and re-use content objects, search and discover content objects, manage content more effectively through versioning and locking, combine content together to form powerful standards-based learning objects, create portfolios, integrate library content, and be used as a workflow tool.

A content system in accordance with one or more embodiments of the invention can be part of an educational system such as, e.g., that described in U.S. patent application Ser. No. 09/608,208 entitled "Internet-Based Education Support System And Methods," which is incorporated by reference herein in its entirety.

Figure 1:
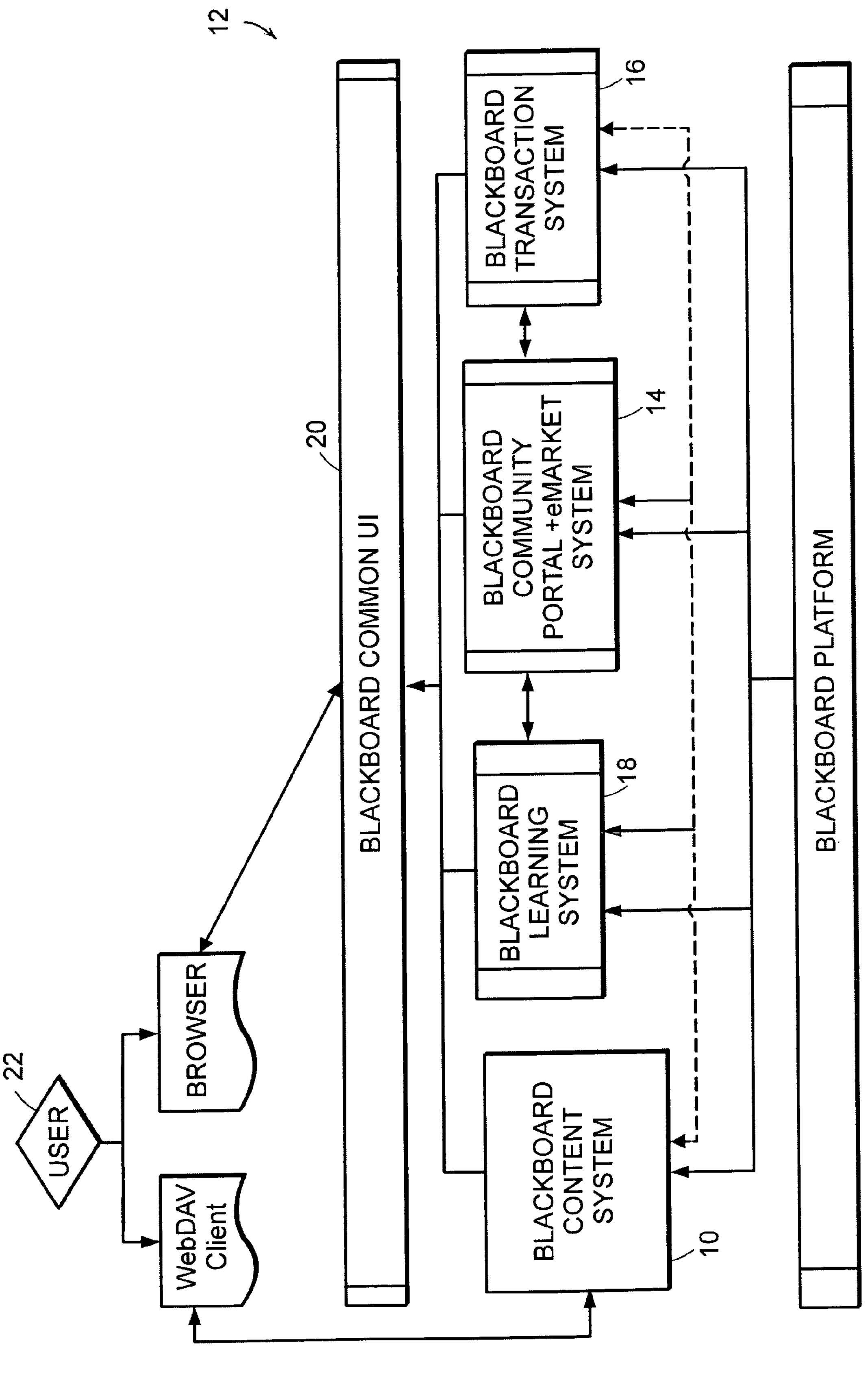
FIG. 1 is a block diagram illustrating implementation of a content system in a network in accordance with one or more embodiments of the invention.

As shown in FIG. 1, a content system 10 in accordance with one or more embodiments of the invention can be integrated in an educational network 12 and can interact with other components of the network, including a portal system 14, a transaction system 16, and a learning system 18, provided, e.g., by Washington, D.C.-based Blackboard, Inc.

The learning system 18 can provide course management, course content, communication capabilities, tools such as digital drop boxes, and calendars.

The portal system 14 can offer community portal environment that substantially unifies academics, commerce, communities, and administrative services online through one integrated interface. FIG. 2 is an exemplary screenshot of a university portal from which a student can access the educational network, including the content system, and other resources.

The transaction system 16 can provide operation of student identification, dining services, bookstore sales, campus commerce such as vending, laundry and copying, building access, as well as business with off-campus merchants. One example of a transaction system is disclosed in U.S. patent application Ser. No. 10/373,924 entitled "Method and System for Conducting Online Transactions," which is incorporated by reference herein in its entirety.

In accordance with one or more embodiments of the invention, the content system can be integrated with one or more of such learning, portal and transactional systems using a common user interface 20 and shared authentication. Content within the content system can be generally seamlessly linked to the learning and portal systems, thereby enabling, e.g., reuse of content, tracking of content, and discrete access control. In addition, role integration can be provided whereby user roles (e.g., students, faculty, and administrators) within the learning system and the portal system are reflected and honored by the content system.

In accordance with one or more embodiments of the invention, the content system 10, portal system 14, transaction system 16, and learning system 18 can be implemented in a server system that communicates with a plurality of terminals or client devices operated by system users (typically, students, faculty, and administrators) over a network.

The client terminal devices operated by users are typically personal computers such as, e.g., Pentium-based desktop or notebook computers running a Windows operating system. Various other client terminal devices can also be used to communicate with the content system including, e.g., personal digital assistants (PDAs), cell phones and other wired or wireless electronic devices. As is well known, a representative personal computer includes a computer processing unit, memory, a keyboard, a pointing device such as a mouse or a touchpad, and a display unit. The screen of the display unit is used to present a graphical user interface (GUI) for the user. The GUI is supported by the operating system and allows the user to use a point and click method of input, e.g., by moving the mouse pointer on the display screen to an icon representing a data object at a particular location on the screen and pressing on the mouse buttons to perform a user command or selection. Also, one or more "windows" may be opened up on the screen independently or concurrently as desired. The client terminals typically include browsers, which are known software tools used to access Web servers. Representative browsers for personal computers include, among others, Netscape Navigator and Microsoft Internet Explorer.

The network can comprise a computer network such as, e.g., the Internet (particularly the World Wide Web), Intranets, LANs, WANs, MANs, or other networks, or some combination thereof.

As will be described in further detail, content systems in accordance with one or more embodiments of the invention can provide many benefits to users 22 of the system (e.g., students, faculty, and administrators), which can include one or more of the following.

Briefly, for instructors, the content system can provide a central place for storing course materials for reuse in multiple courses. It can be used by instructors to easily move content for various uses, e.g., for moving content across folders and content areas. The content system can provide simplified access to content via Web and WebDAV interfaces. It can also provide flexible access control. The content system can allow instructors to easily share course materials with other instructors. In addition, it can be used for locating materials for reuse. The content system can also be used for storing and sharing and searching for research and articles. In addition, the content system can allow instructors to create and share career portfolios. The content system can also be used as an online space for making research available to the public. The content system can, in addition, provide a secure encrypted method of sharing content.

For students, the content system can be used as personal disk space. It can be used as a storage for materials including homework, assignments, and research. The content system can be used to create and display portfolios for showing work and selected personal information to others inside and outside the institution. The content system can also be used for storing and sharing materials for group projects. It can also be used for storing and sharing of materials for student organizations. The content system can be used as an Internet based personal disk space, accessible anytime and anywhere. In addition, the content system can be used for submitting workflows for assignments and homework. The content system can also provide a secure encrypted method of sharing content.

For librarians, the content system can be used for storing electronic texts and research. E-reserves, copyright cleared course materials can be made available using the content system to users enrolled in specific classes. The content system can be used to make supplementary course materials available to instructors, organized by discipline, department, or course category. The content system can also provide content labeling and categorization. It can also be used to control who can use content and for what duration.

For IT administrators, the content system can provide a common structure for content storage rather than supporting multiple departmental and other inconsistent "local" storage systems. The content system can integrate with learning and portal systems. In addition, the content system can provide a common infrastructure for all courses, organizations, users, groups, etc., yet allow local customization of directory structures, sharing, naming conventions, with a good balance between overarching consistency and personal control. The content system can be used for reporting to track the who, when, and where of content storage in order to plan for growth and identify excessive use. The content system can control use and necessary expansion of a storage system through robust quota management. It can be used to control network use and for necessary expansion through robust bandwidth management. The content system can securely transfer sensitive data. It can be used for efficient file storage, and for scalable content management.

For a copyright officer, the content system can provide context for appropriate fair use practices, by controlling who has access to what content during a specific time period. The content system can also be used to assist institutions in complying with the TEACH Act by providing a framework for making materials available only to users who are enrolled in a course and only for the duration of the course. The content system can also be used to control access to materials copyrighted by the institution and its faculty and staff.

For the public affairs office of an institution, the content system can be used to provide a common repository of standard institutional images, logos, document templates, etc. for consistent use of the institutional identity. The content system can also be used to control who has access to standard institutional images, logos, etc. In addition, the content system can be used to update master copies of images, logos, etc. rather than tracking down copies of the original that may be scattered throughout the institution.

In accordance with one or more embodiments of the invention, the content system is integrated in an educational system that is readily adaptable to accommodate multiple languages. Such multi-language capability is advantageous for organizations having diverse user populations. An example of an education system with multi-language capability is described in U.S. patent application Ser. No. 10/443,149 entitled "Internet-Based Education Support System And Method With Multi-Language Capability," which is incorporated by reference herein in its entirety.

Figure 3:
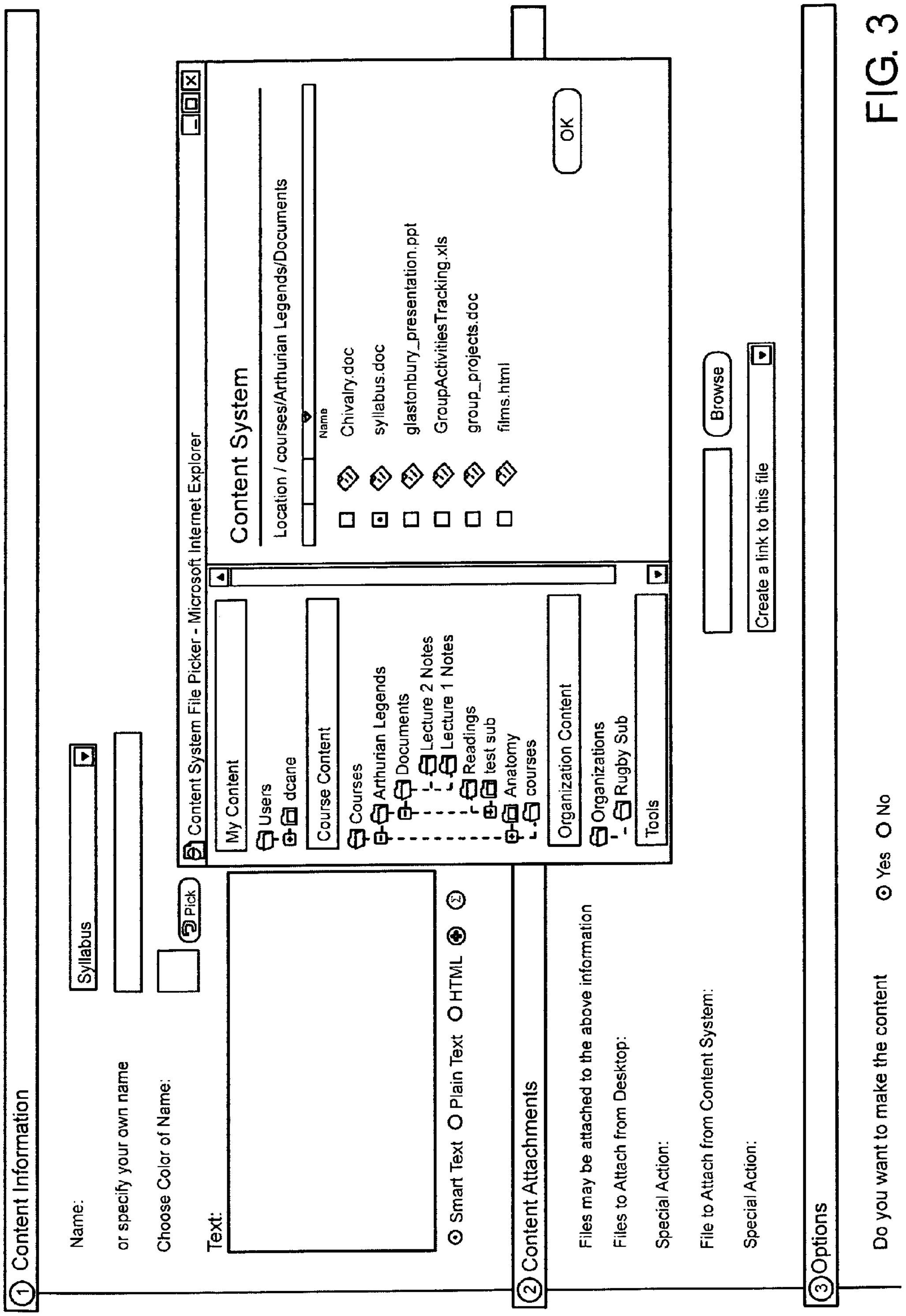
FIG. 3 is an exemplary screenshot illustrating the addition of content to a course in accordance with one or more embodiments of the invention.

In accordance with one or more embodiments of the invention, the content system allows sharing, searching for and reusing content assets. Content can, e.g., be shared across courses, departments, users, and organizations. For example, in the past, a course instructor teaching multiple sections of a course would have to manage the course content for each section separately, which is time consuming and can create versioning problems with duplicated files. Using the content system, the instructor can efficiently manage the course content (e.g., make content changes, additions or deletions) at one source location (e.g., at a content repository) and link the content to separate course files for each of the sections. Accordingly, content items can be efficiently reused. FIG. 3 is an exemplary screenshot illustrating how content can be added to a course (i.e., a set of materials accessible to students enrolled in a given course).

The content system can also allow content to be searched, e.g., by metadata and/or full text searching as illustrated in the exemplary screenshot of FIG. 4.

In addition, the content system can manage file versioning, monitor checkin/checkout, and be used as a workflow tool. Workflow refers to the process by which content items are transferred from one user to others for their actions. FIG. 5 is an exemplary screenshot of a workflow page for transferring content. FIG. 6 is an exemplary screenshot of a page for managing workflow activities.

As discussed in greater detail below, a content system in accordance with one or more embodiments of the invention can include (1) a virtual hard drive system, (2) a portfolio system, (3) a library content integration system, (4) an object catalog, and (5) a link checker.

Virtual Hard Drive

In accordance with one or more further embodiments of the invention, the content system can also include a virtual hard drive system, which serves as a content repository for storing content, managing access control to the content, and providing scalable and robust features for effectively managing content in an easy-to-use fashion. The virtual hard drive system is an Internet based secure file storage space for users. Users can access, browse, and share files via a Web user interface and/or WebDAV (Web Distributed Authoring and Versioning). WebDAV is a set of extensions to the HTTP protocol that allows users to collaboratively edit and manage files on remote Web servers. WebDAV can be an alternative to the Web user interface for managing files, including drag and drop functionality.

Figure 7:
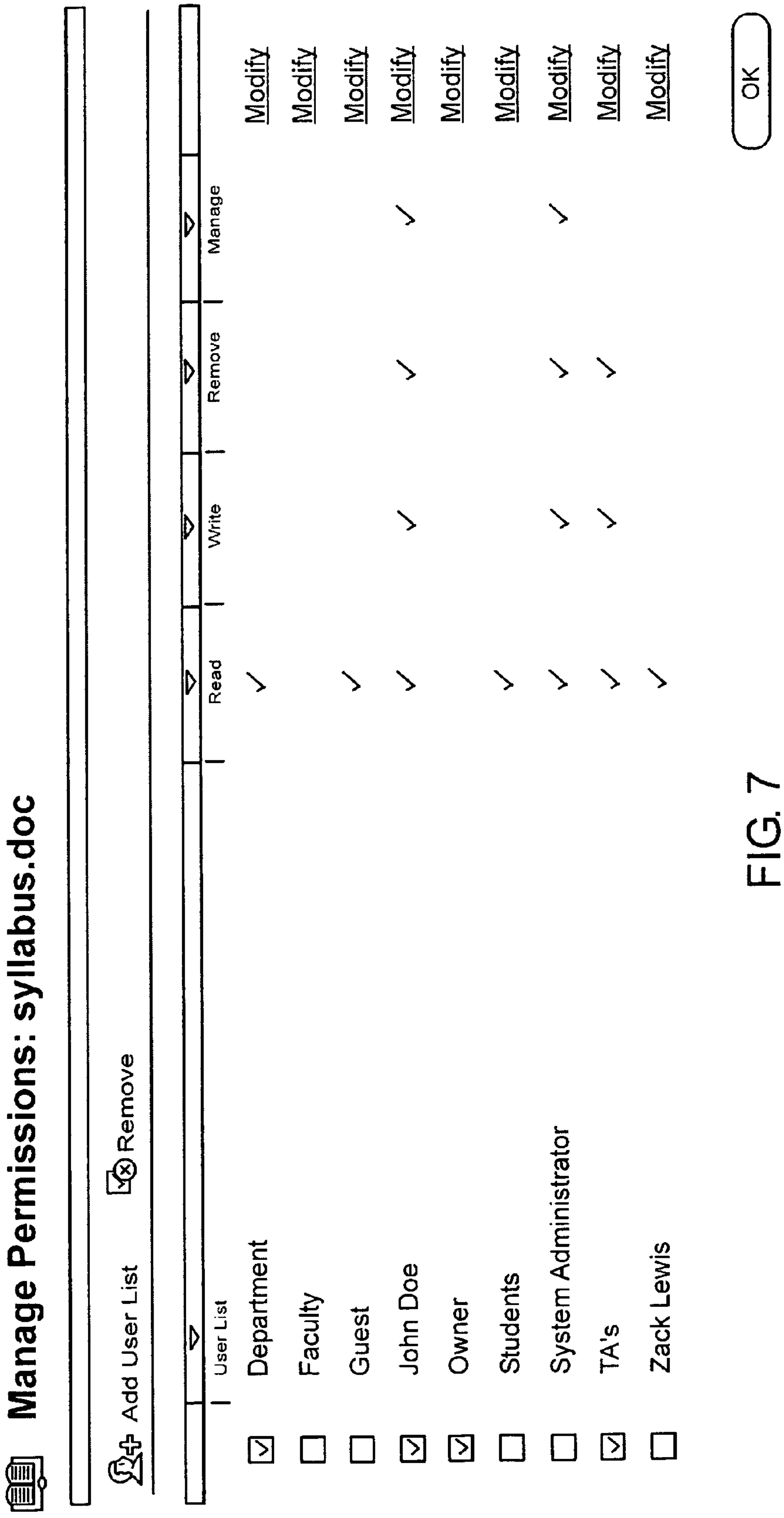
FIG. 7 is an exemplary screenshot illustrating permission management in accordance with one or more embodiments of the invention.

The virtual hard drive system can organize content into collections (such as individual collections, course collections, organization collections, and institutional collections). The collections act as distinct repositories of content that can be organized by creating folders. Access to collections or content can be controlled by permissions. Permissions can include read, write, delete, and manage, and can be set by individual users or user lists, which are collections of users. FIG. 7 is an exemplary screenshot illustrating permission management.

Figure 8:
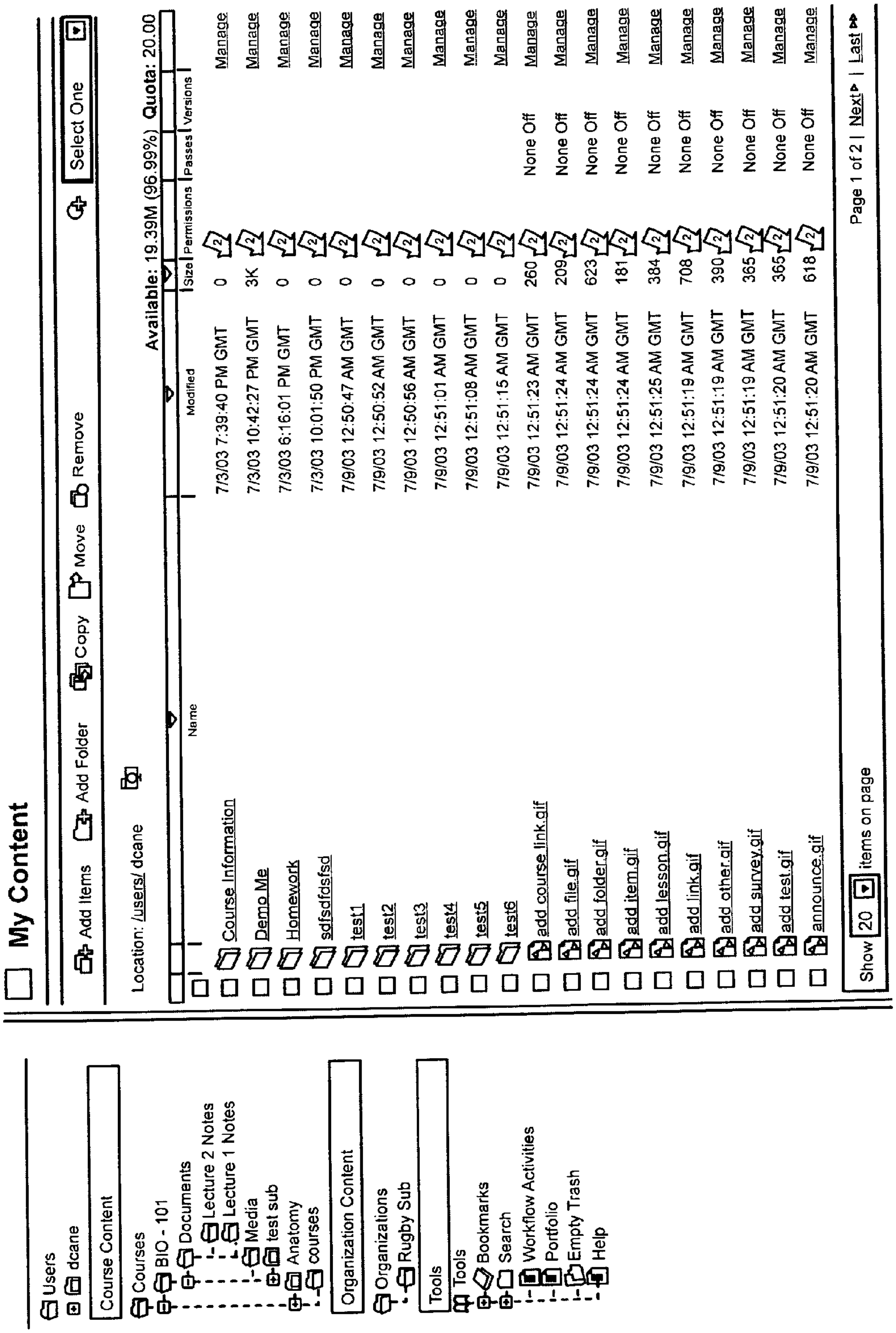
FIG. 8 is an exemplary screenshot of a directory listing in accordance with one or more embodiments of the invention.
Figure 9:
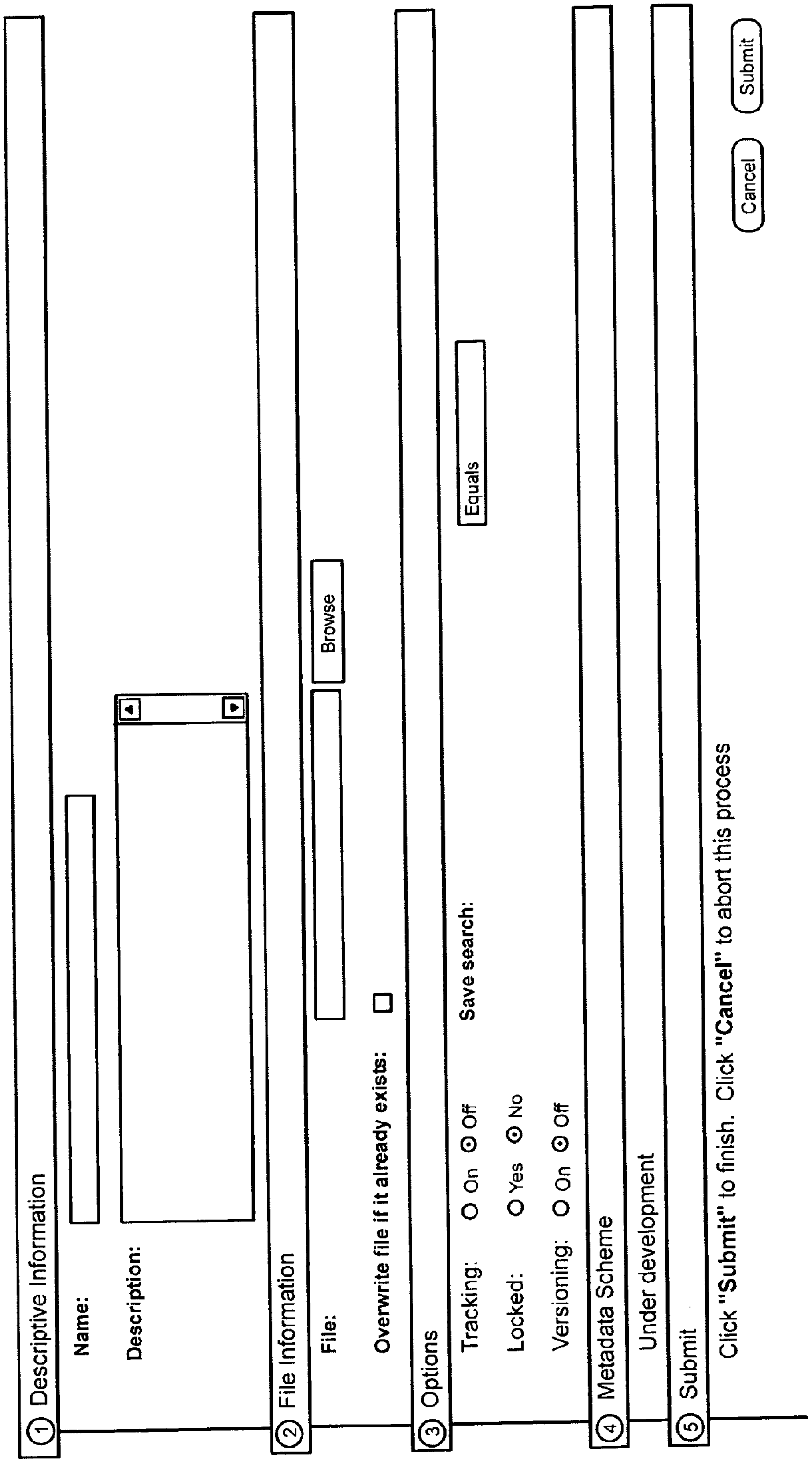
FIG. 9 is an exemplary screenshot illustrating the addition of a content item in accordance with one or more embodiments of the invention.

FIG. 8 is an exemplary screenshot of a directory listing in the content system for a user. Content can be in public or private files. The user can expand folders to display subfolders and lists. Users can store files, organize files (using folders), and share files from their "My Content" area. FIG. 9 is an exemplary screenshot illustrating how a content item can be added to My Content. FIG. 10 is a screenshot illustrating how properties can be set for added content.

In accordance with one or more embodiments of the invention, different storage quotas and bandwidth control can be provided for different groups of users. For instance, students can be provided 20 MB of storage space and faculty can be provided 40 MB of storage space. Disk quotas and bandwidth controls can also be based on individual directories, e.g., a course directory. The virtual hard drive system can enforce disk quotas and bandwidth controls set by administrators.

The virtual hard drive system preferably allows versioning of stored content, which enables multiple versions of a single document or file to be stored and a history of changes viewed. FIG. 11 is an exemplary screenshot illustrating management of versions of a document or file.

Files in the content system can preferably be tracked to monitor which user took what action (e.g., read, copied) with respect to the file. FIG. 12 is an exemplary screenshot illustrating tracking.

Portfolio System

In accordance with one or more further embodiments of the invention, the content system can include a portfolio system, which allows users such as students and faculty to create online portfolios. A portfolio is a compilation of materials a user can make available to others via a Web page, typically for specific purposes such as, e.g., a job search. The user can give a particular portfolio a specific name (e.g., "My Resume" or "My Stuff"). Portfolios can include personal portfolios (used, e.g., in a job search or graduate school application), course portfolios (e.g., a compilation of work submitted by a student to an instructor at the end of a term), portfolios of student work submitted by instructors to administration, and collaborative and other portfolios.

Figure 14:
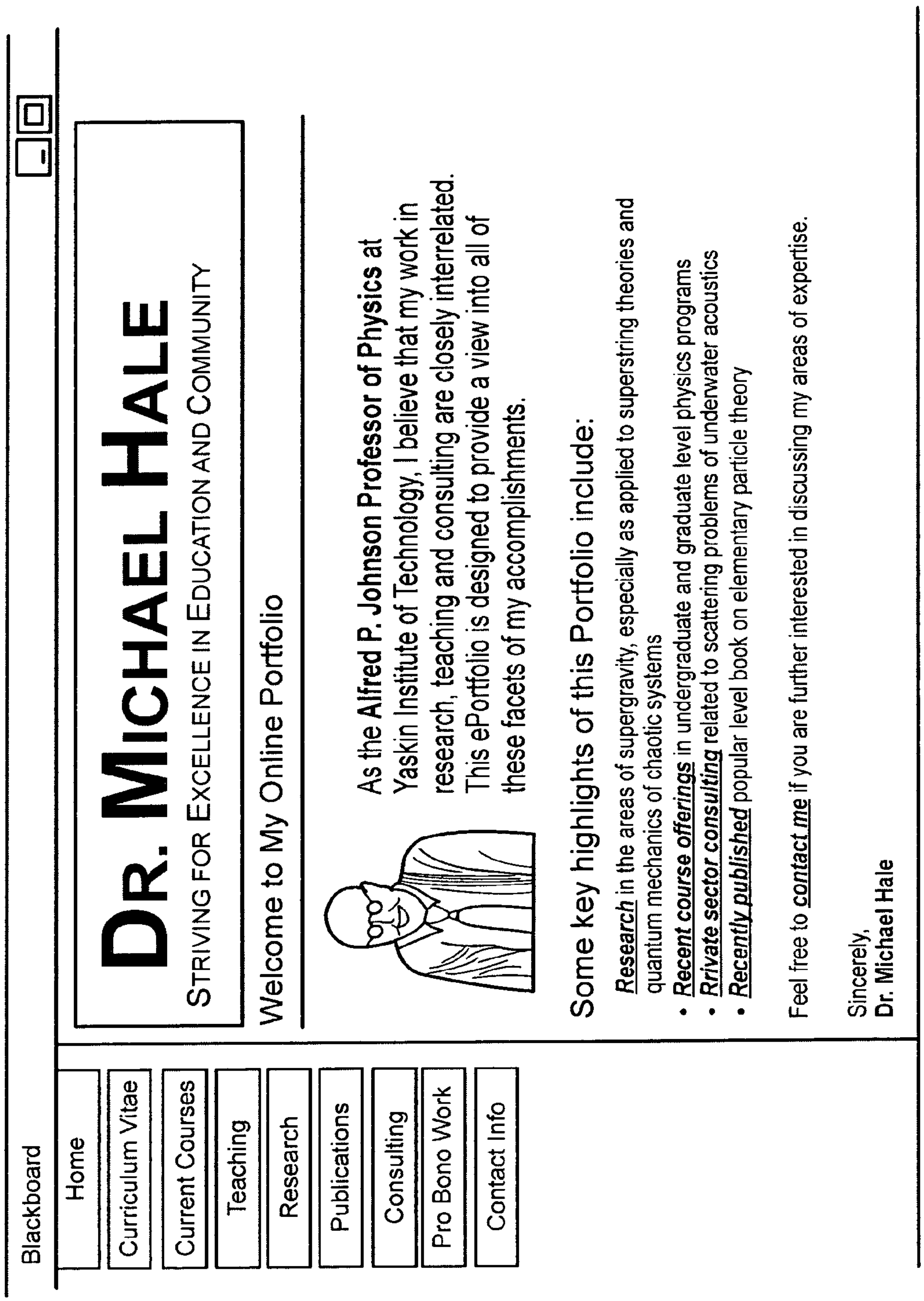
FIG. 14 is an exemplary screenshot of a portfolio of a faculty member.

The system allows users to create multiple portfolios based on intended audiences. For example, a student can create one portfolio for potential employers and another portfolio for use in graduate school applications. Student portfolios can include, e.g., material describing courses taken, projects, and work experiences. FIG. 13 is an example screenshot of a student portfolio. Faculty portfolios can include, published papers and descriptions of research. FIG. 14 is an example screenshot of an portfolio of a faculty member.

The portfolios can be shared with users both inside and outside of the institution. Access to the portfolios can be restricted, e.g., for a specific number of views or for a specific length of time.

The portfolios can be created without the need for knowledge of HTML use using a "Wizard" style creation and selection of portfolio content. Users are provided with templated layouts that can be easily filled with desired content.

Library Content Integration System

Figure 15:
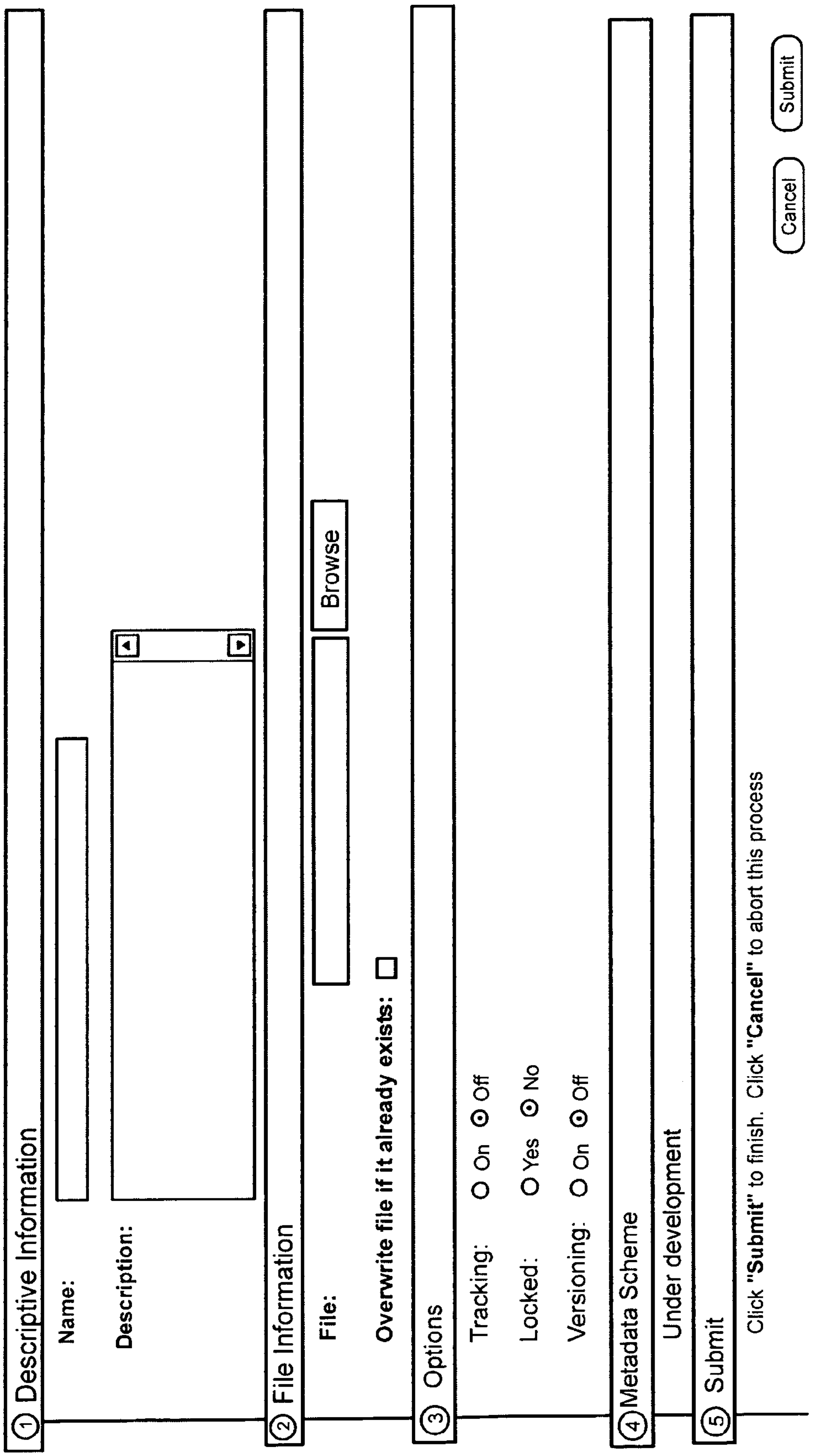
FIG. 15 is an exemplary screenshot illustrating addition of content items on reserve in accordance with one or more embodiments of the invention.

In accordance with one or more further embodiments of the invention, the content system can include the ability to integrate library content or resources into courses. This allows librarians to manage library related content in course files. For example, a librarian can place content into folders of a particular course, e.g., copyright cleared materials that are on reserve for students enrolled in that course. FIG. 15 is an exemplary screenshot illustrating addition of content items on reserve. Preferably, the librarian cannot make changes to other areas of the course content. The content added to folders can be tagged with standard metadata, e.g., Dublin Core and IMS.

The learning system and the portal system can implement a role-based system that is attached to each user. The content system preferably honors these roles and display interface elements in the correct context based on the roles.

The learning system and portal system roles can be mapped into a user list infrastructure within the content system. These can include course roles, portal roles, and system roles. The learning system course groups can be mapped into "group" infrastructure within the content system.

For example, an instructor logs into the learning system, and clicks through to his or her course control panel. He or she then creates a course content item that is linked to the course content selection within the content system. She or he then browses to the course content collection. The content system has already mapped the instructor role of this course to the proper permissions structure for the course content collection, thereby granting access to the instructor to read, modify, or remove any files within the course content area.

Users of the content system can protect their documents from others gaining access. Users can give others selective access to files or folders in the "My Content" area. Each file and folder can have, e.g., Read, Modify, and Delete permissions. Users can have the ability to share each folder and file with other users or user lists. For example, consider a user who wants to share a particular file with a peer. The user can locate the files by browsing to the file in his or her collection view, click on a button to display the permissions, and then add the user that he or she wants to give access to. For each user (or user list), the owner can set the Read/Modify/Delete permissions.

Also, e.g., a student might want to protect a few of his or her personal files. The student can locate the files, click to view the permissions, then remove all users and user lists that have access to the file. Alternatively, the student simply removes permissions for all users and user lists.

In order to reduce mistakes with setting permissions on folders, the content system can support inheritable permissions within a folder tree. More specifically, permissions that are setup on a folder can be recursively applied to all children of the parent folder.

The content system can allow access and linking to discrete versions of files, e.g., the latest version of a file can be specified or some given earlier versions, if so desired.

The content system can allow all content within a collection to be web-accessible with a single URL, so that users can cut and paste URL links to share documents and reference materials that are stored within the collections.

The content system preferably "tags" each piece of content with metadata in order to effectively track and identify content within the system. The content system preferably implements industry-standard metadata schemes such as, e.g., those put forth by the IMS.

Institutions need to limit any abuse and misuse of content storage space with regards to file storage allocation. The content system accordingly can support quotas for each individual stored collection, so that users cannot store extraordinary amount of data (e.g., a student's entire mp3 archive) and share it out to the campus. Quotas can preferably be enforced from both the Web interface as well as the WebDAV interface. The content system administrator is preferably able to universally set quotas for all collections in the system. The administrator can preferably identify a single collection and manually set the quota to any value. If desired, quotas can be applied to folders, not users.

The content system can have a mechanism to allow a system administrator to view the amount of content that is stored within the content system, and obtain more detailed views of content usage, especially as it pertains to quotas. Quota reports generated by the system can show system-wide quota allotment versus used space. The quota reports can allow the administrator to search for particular collections and deliver a summary of quota and disk usage for the collections selected.

Users may want to be able to share certain distinct pieces of content with users that do not have an account within the content system. The content system can support a pass-based system that safely allows non-network members to access content. The passes that are generated can be sent to the destination user as a URL, and provide either time-based or number of use-based access to the designated content item.

Content system users collaborating on a project can have the ability to work together on the same file instead of sending multiple copies back and forth to determine which changes were made to which version. The content system can support basic file versioning with a history feature to view revision details. The content system can preferably support an unlimited number of revisions per content item. The revisions can include a "comments" meta-data attribute that can contain user specified comments about the particular revision.

For effective document collaboration, the content system can allow users to have the ability to "check out" a file to be worked on, effectively giving them the exclusive ability to modify that particular file. This keeps others from being able to modify the file. The content system can support "check-in" and "check-out" of content. Upon check-out, the content item effectively becomes "read-only" for any other user other than the one that has the item checked out. Upon check-in, the content can automatically be committed as a new revision. Upon check-in, the user can have an opportunity to fill in the "comments" field. The content system can provide a facility for "undo-checkout," which checks the content item back in but does not execute a new revision.

The content system can allow each user an area to view the status of any tasks he or she needs to complete or participate in for improved implementation of workflow. The content system can provide a robust "My Activities" tool, where the user can go to view all the workflow-related tasks he or she needs to complete. The "My Activities" area can be an aggregate view of all workflow-related tasks that the user has waiting for him or her. The "My Activities" area can be available as a Portal Module at the Portal level for quick access and referral by the user.

The content system can allow users (instructors and students) to participate in a two-step workflow, that involves Party A sending an item to Party B for review. Upon review, Party B can "return" the item to Party A. The content system allows for a two-way exchange to occur, where the status of the task is tracked, and both initiator and reviewer can view the status of the workflow at any time. The content system can provide a way to access workflow data from within the course, preferably at the course content item.

The content system can allow users to expose designated "subsections" or individual content items in a portfolio context. Building off of the permissions and pass-based control infrastructure, the content system can provide a mechanism (Web-based and e-mail) that simplifies the task of "assembling" and "publishing" the individual's portfolio. The user can designate specific folders or items. A portfolio wizard can build a webpage that aggregates all of the selected links into a single view, with a unique name for each portfolio. Each user can preferably be able to create an unlimited number of portfolios. Each portfolio can have a name, description, availability indicator, and offer customization options to the user.

For parity between the learning system user population and the content system population, users existing in a learning system such as the Blackboard Learning System preferably also exist in the content system.

Users of the learning system, the portal system, and the content system can have a generally seamless experience without ever having to re-authenticate. For full compatibility with other Blackboard products, the content system can generally seamlessly support all the authentication protocols supported by the Blackboard platform. WebDAV access can require re-authentication and may restrict the forms of authentication possible. Also, content system users who have authenticated into the learning system should not have to re-authenticate into the content system.

In order to more easily integrate the content system with a pre-existing learning system, a mechanism can be provided to allow existing course content to be moved into the content system. A conversion tool can be provided that allows course data to be moved from the learning system into the content system. This is preferably implemented using the content APIs, if possible The content system can archive/restore the content stored in the system. A content exchange engine can be provided to support archive/restore of "My Content" and "Course Content" into and out of the content system.

The content system can have a search capability that includes full-text search of Microsoft Word, Excel, PowerPoint and other documents and on the meta-data that accompanies content within the content system. The search can be restricted down to an individual's collection but be as wide as the entire system. Search results can be returned in ranked order.

As previously mentioned, institutions need to limit any abuse and misuse of content storage space with regards to file storage allocation. By regulating the bandwidth in and out of any particular collection, the System Administrator can effectively throttle the amount of data that can be accessed within any particular collection. For each collection, the content system can preferably measure the amount of data that has been uploaded/downloaded within a variable time period. (e.g., day, week, month). The time periods can be flexible enough to support a date range in increments of day, week, or month. The content system can have bandwidth reporting capabilities for the System Administrator.

In order to provide increased extensibility, the content system can provide APIs into metadata.

In order to minimize the impact to integration with the learning system, but still deliver a seamless, integrated environment for the learning system and the content system, an integration agent can be provided that allows instructors to add content from their "My Content" or "Course Content" areas from within the content system. Students and faculty can be provided with areas within the course and portal environment (e.g., Tools) to enter their "My Content" area.

A building block can be provided that contains a new Content Type with a content address link. Launch points can be implemented as System Tools for (a) My Content, (b) Course Content, (c) Institution Content, and (d) My Activities. Launch points can be implemented as a Portal Tool and Portal Modules for (a) My Content Module and (b) My Activities Module. Launch points can be implemented as a Course Tool for Course Content. One or more new portal module types can be provided that access content from the Content System (e.g., to include an image in the module or link to a Content System file).

Content Catalog

In accordance with one or more embodiments of the invention, a content catalog is provided that allows users to easily reuse and share content among a broad audience. The catalog allows users to electronically search the catalog or browse by category to find content items they might wish to use.

The catalog can include user facing functionality that allows users to nominate their items for inclusion in internal and/or public catalogs. Users can use the catalog to browse, view and select items therefrom. In accordance with one or more embodiments of the invention, an administrator can have control over catalog categories and availability on the system.

The catalog is preferably accessible from a content system menu. System Administrators can control who can access the catalog, e.g., by the institution role of the user. For example, a school might not allow alumni users to browse the catalog.

Catalog entries can be found, e.g., by searching for a desired entry using its name or other metadata associated with the entry or by browsing the categories. Category creation is described in further detail below.

In accordance with one or more embodiments of the invention, a system administrator can specify who can submit catalog entries, e.g., by institution role. For instance, a school might not allow students to submit entries to the catalog.

A variety of items may be added to the catalog. A catalog entry can be created for an individual file in the content system (such as, e.g., a Shockwave file) or an entire folder (which might be used if a web site is the content object). Users can access, e.g., a "Manage Catalog Entries" page from a "Modify" link on any item or folder for which they have manage permission. From this page, they can create a catalog entry, modify an existing entry, or remove their entry from the catalog.

A catalog entry is a wrapper containing information about a given content item. Users can select a category for their catalog entry and fill in basic information such as, e.g., name, authors, description, keywords and learning objectives. All of this information can be drawn from the metadata for the item itself (if that has been filled in), but can be distinct from that metadata. This means that the description for the catalog can be different from the general description used in other contexts. Users can create and manage multiple entries for a single item.

In accordance with one or more embodiments of the invention, a catalog entry can be submitted to more than one category. Users can create multiple catalog entries for an item or folder. Each catalog entry is preferably managed separately by the user, and it can be approved separately by a so called catalog manager. This means that while the item might be rejected for one catalog category, it could be accepted for another.

The catalog manager can be the system administrator or some other person designated for approving catalog entries. The system administrator can grant catalog manager status to other users by, e.g., institution role. Anyone on the system, regardless of course or system role, can be allowed to be a catalog manager as desired. It may be beneficial for catalog managers to be experts or otherwise knowledgeable in the subject matter in a field when reviewing catalog entries and creating catalog categories. The system administrator can create a new institution role for this function (e.g., catalog administrator) and assign that role as a secondary role to those users who should have this right.

Catalog managers can preferably modify catalog entries from a Manage Catalog Entries page. They can change information about the item including the category to display the item in.

If a user modifies an item in the catalog, the catalog entry status can be returned to "pending." This allows administrators to reclassify or possibly reject this new version.

Users can access status information from their "Manage Catalog Entries" page (available from the item or folder modify page). From this page they can see if their item is pending, accepted or rejected.

Catalog review responsibilities can be shared. Catalog managers can filter and sort entries to distribute review responsibilities according to whatever business rules are appropriate at a given school. For example, a school might have one catalog manager responsible for reviewing entries in the History category and another catalog manager responsible for reviewing entries in the Science category.

Catalog managers can create a very large set of high-level categories and sub-categories. For usability purposes, however, top-level categories can be limited to 50 or less and subcategories to 20 or less.

In accordance with one or more embodiments of the invention, a public catalog of content objects can also be provided. Users can select whether to make their items available in this public catalog when they create catalog entries. Otherwise, catalog entries are available internally only.

Internal catalog entries can grant read permission to generally all system accounts on the item or folder associated with the entry. Public catalog entries can grant read permission to the public on the item or folder associated with the entry.

If an item is moved or removed, an error can be displayed when a user clicks on the catalog entry in the catalog view. If permissions have been removed, the link can no longer be viewable by all system or public users.

FIGS. 16-22 are sample screenshots illustrating one use case example of how a user (in this case, a college professor) searches for and finds a content item in the catalog and then adds the item to a set of course materials accessible by students taking a course. In these screenshots, pointer bubbles are used for annotation to provide further description about a particular item or action on the screen. Also, rectangular blocks are used to provide information about the scenario or background information used to describe the process.

Figure 16:
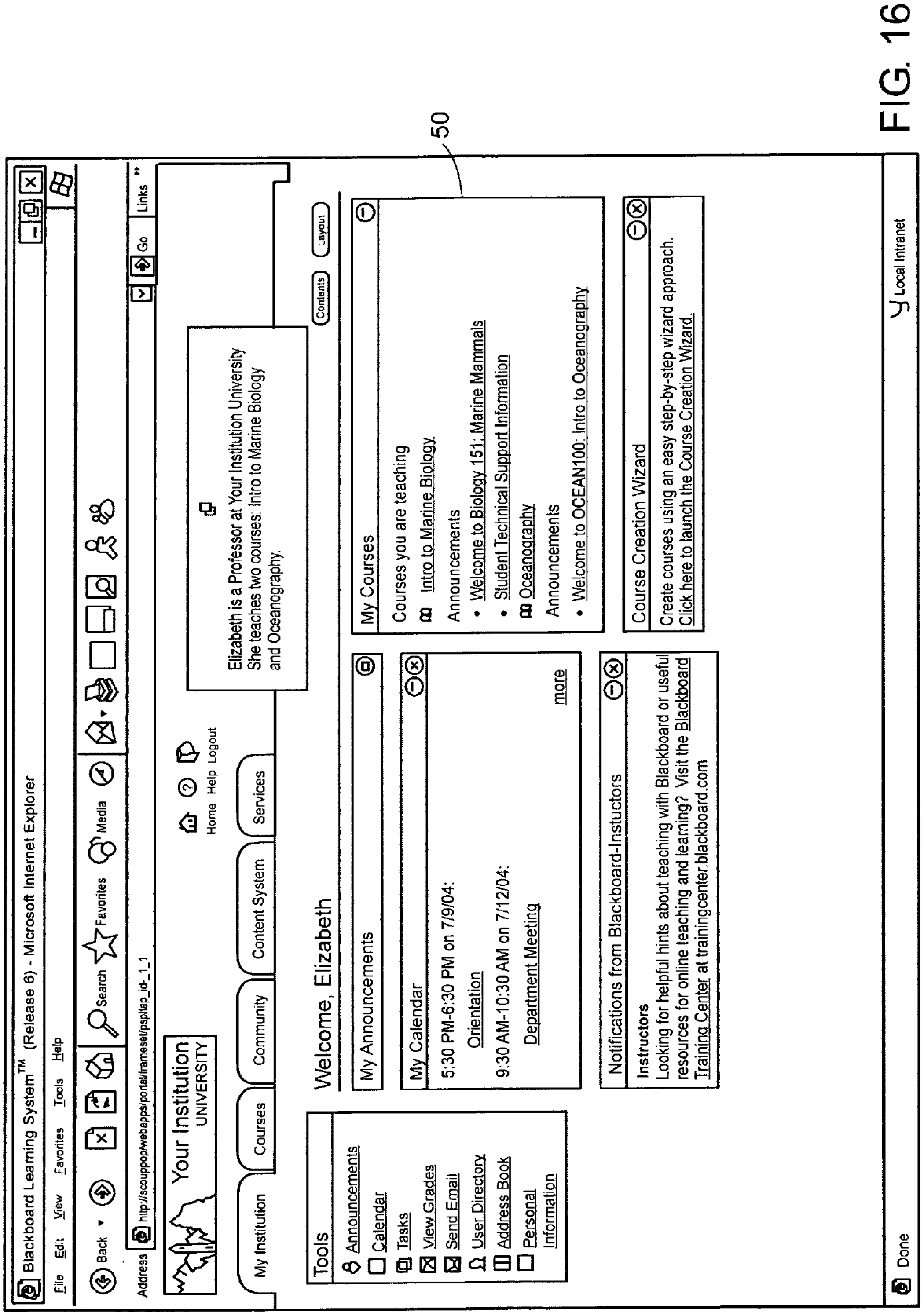
FIG. 16 is an exemplary screenshot of an instructor home page.
Figure 17:
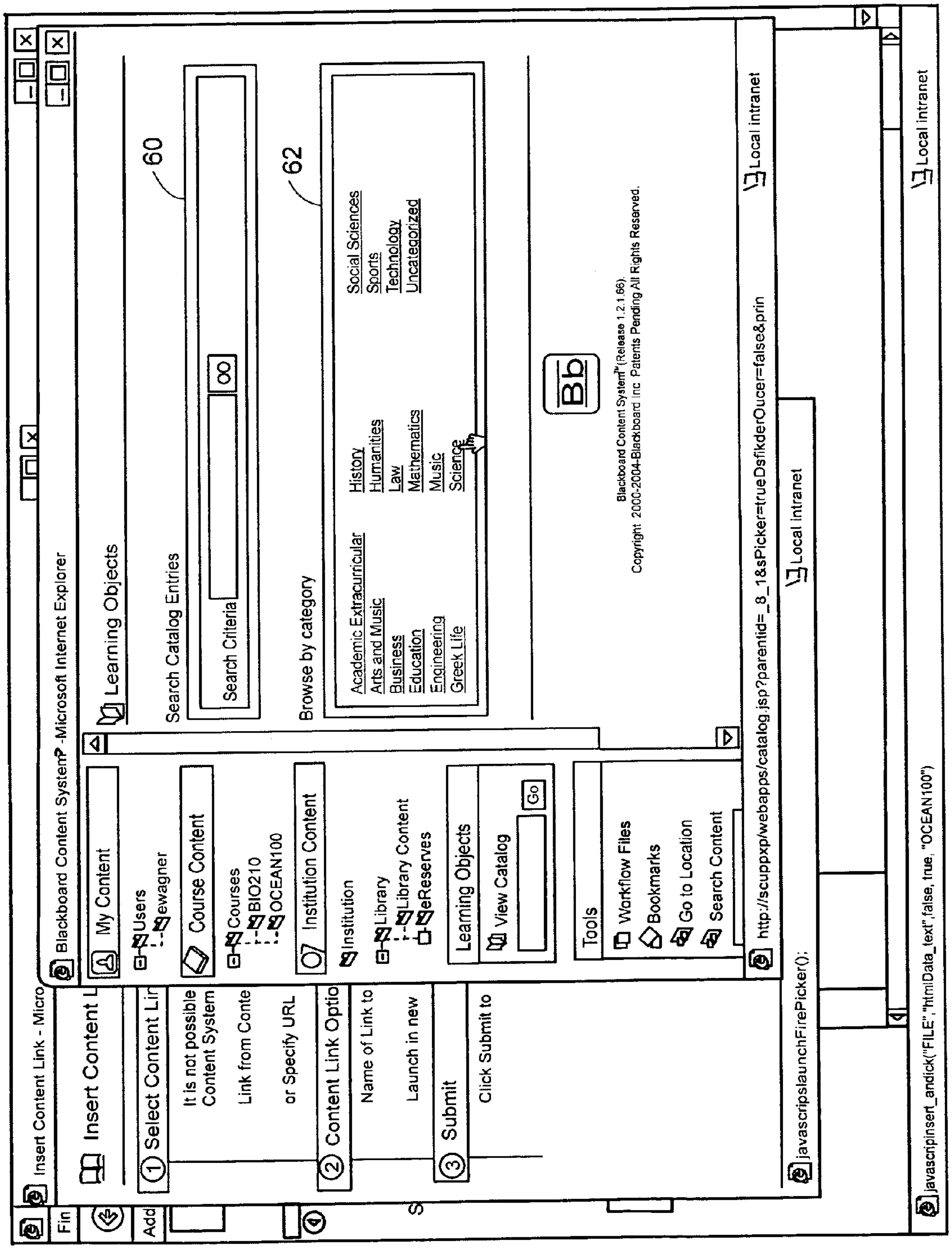
FIG. 17 is an exemplary screenshot illustrating searching for a content item in accordance with one or more embodiments of the invention.
Figure 18:
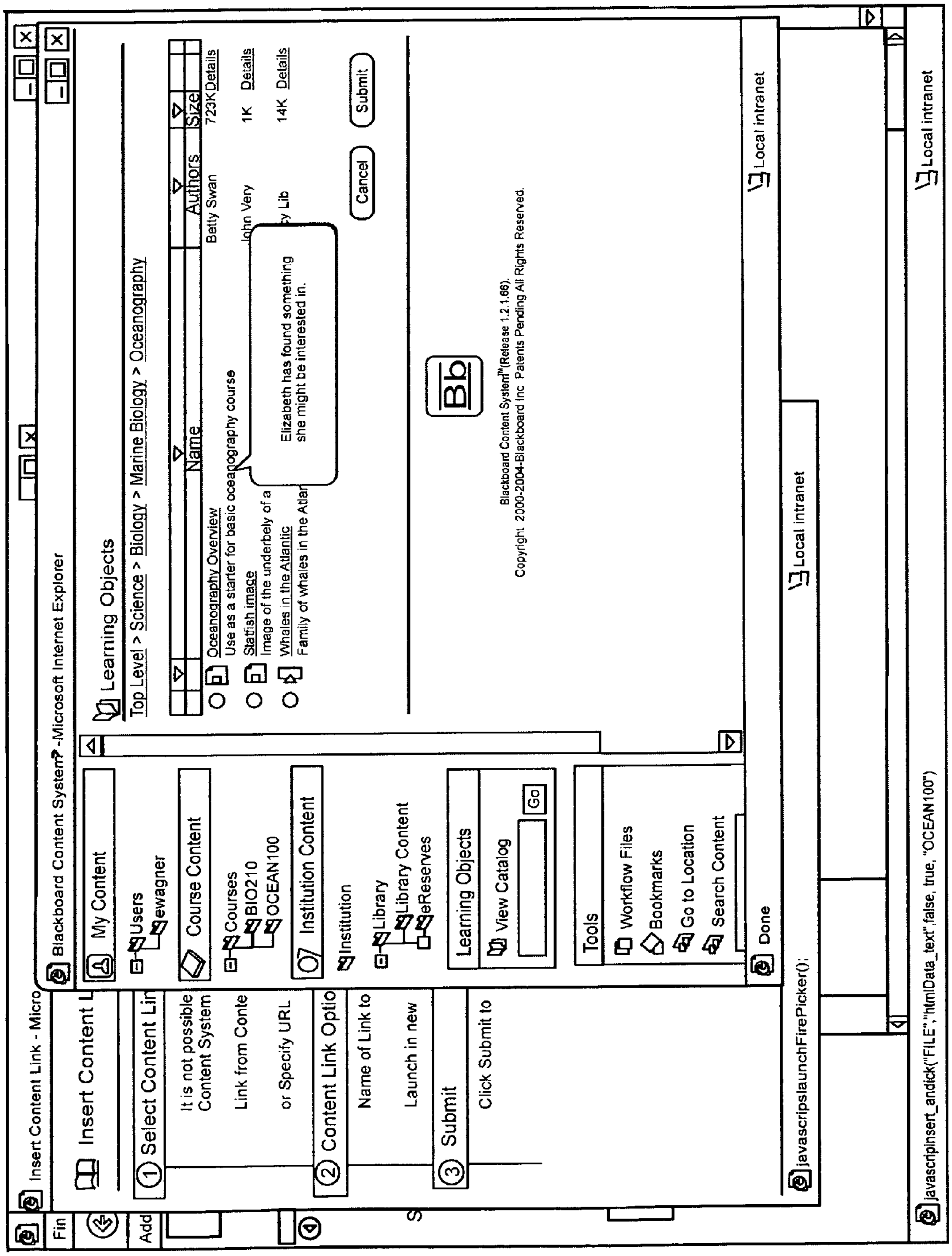
FIG. 18 is an exemplary screenshot illustrating searching for a content item in accordance with one or more embodiments of the invention.
Figure 19:
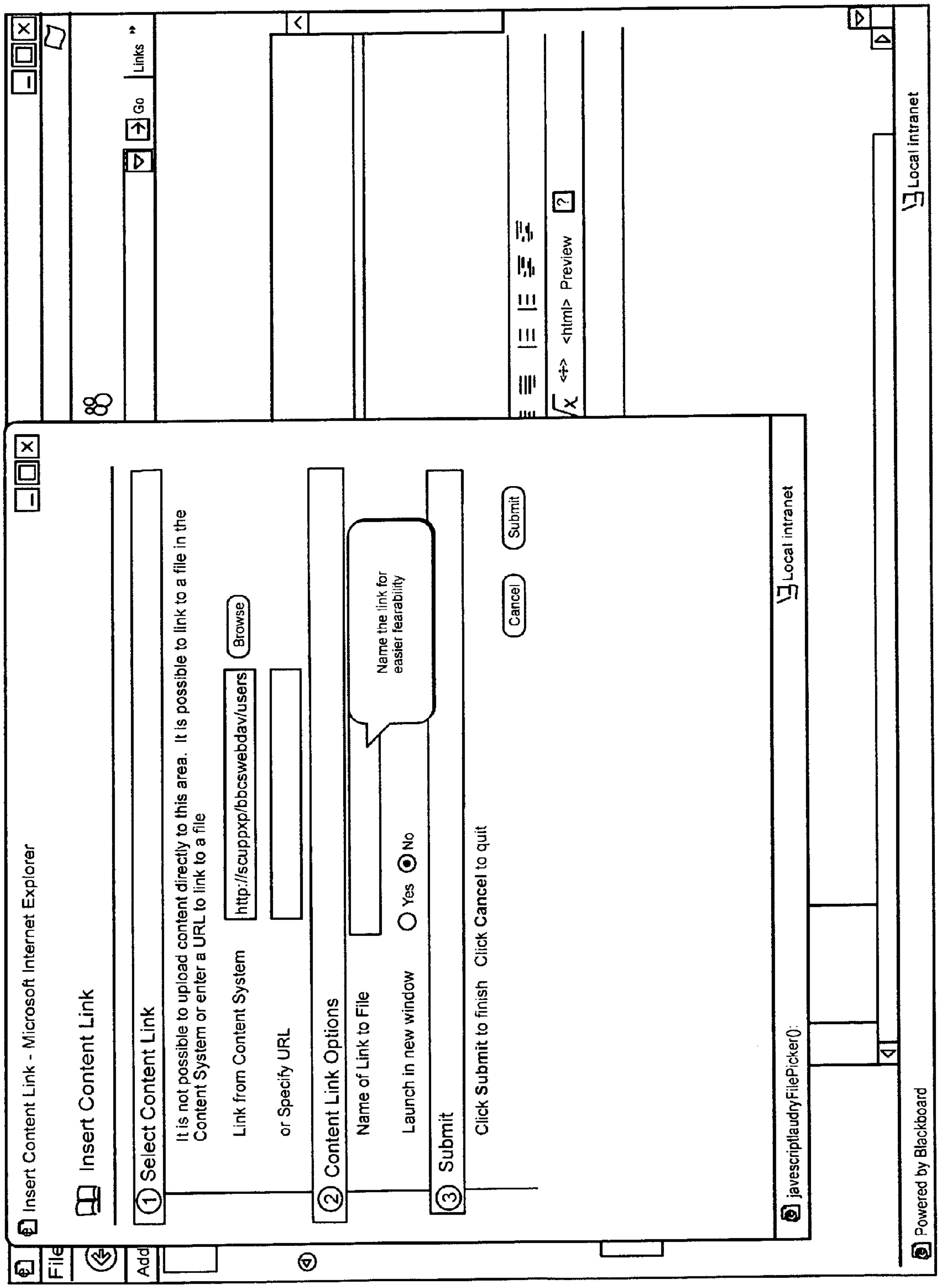
FIG. 19 is an exemplary screenshot illustrating addition of a link to a content item.

FIG. 16 is an example of a home page of a user (a professor named Elizabeth), which identifies in area 50 courses taught by her. She wishes to add to her course on oceanography an introductory article on the subject. She can then access the content system to look for such an article as illustrated in the exemplary screenshot of FIG. 17. As shown, she can perform a text search for catalog entries at 60 or browse by category at 62 (and various subcategories). FIG. 18 shows a content item selected by the user. FIG. 19 illustrates how the content item can be linked to the course.

Link Checker

In accordance with one or more further embodiments of the invention, a check links tool is provided to allow users to verify links to items in the content system. Links might break for two primary reasons. First, the item in the content system may have been renamed, moved, or deleted by someone with manage permission on the item. Second, all users (students, TAs, etc.) may not have permission to view the item. (Read permission is generally required, and is automatically added on the item's "Manage Permissions" page when a link is created, but someone may have inadvertently removed this permission.)

Users who click on a broken link receive an error. Users can receive a "File Not Found" error for broken links. For missing permissions, they can receive an "Access Denied" error.

The check links tool helps ensure that course, organization and portfolio user can access content that resides in the content system. The check links tool scans content areas and portfolio pages for broken links and reports the results. The check links tool is preferably accessible from a control panel of all courses and organizations in the content system or from the portfolio manage page. The system administrator can enable this tool from an administrator panel. Links can be designated as follows:

1. Valid link: All course users will be able to view the item when clicking on the link in the course or organization environment or from a portfolio.
2. Path not found: This will occur if the item (file or folder) in the content system has been renamed, moved, or deleted. Users can receive a "File Not Found" error. The course or organization builder (e.g., Instructor, TA or course builder) or portfolio creator can either return to the content system to replace the original file, or recreate the link in the course or portfolio to the new name/location in the content system.
3. Repairable permission error: The link to the item (the path) is valid, but read permission does not exist for all course users or all system accounts. For example, so even though the instructor or portfolio creator can view the item properly, students and other system users would receive an "Access Denied" error. The tool allows the instructor or portfolio creator to repair the permission error by clicking a "repair" button that can add the appropriate read permission back to the content system item.
4. Un-repairable permission error: The link to the item (the path) is valid, but read permission does not exist for all course users or all system accounts. Additionally, the user that ran the tool does not have manage permission for this item, so he or she cannot repair the permission problem like in the use case above. The user must contact someone (such as, e.g., the system administrator) with manage permission on the item to add the appropriate permission.

The check links tool can scan the validity of links in various areas including, e.g., the following:

1. Content areas (course documents, course information, syllabus, etc.)
2. Staff Information
3. Announcements, calendar events, tasks
4. Learning unit shells
5. Discussion boards (e.g., threads that have links to images residing in the content system)
6. Portfolios The check links tool is particularly useful after copying, restoring, or importing courses or organizations or after copying a portfolio. The tool can be made available or unavailable in the Administrator Panel.

Figure 20:
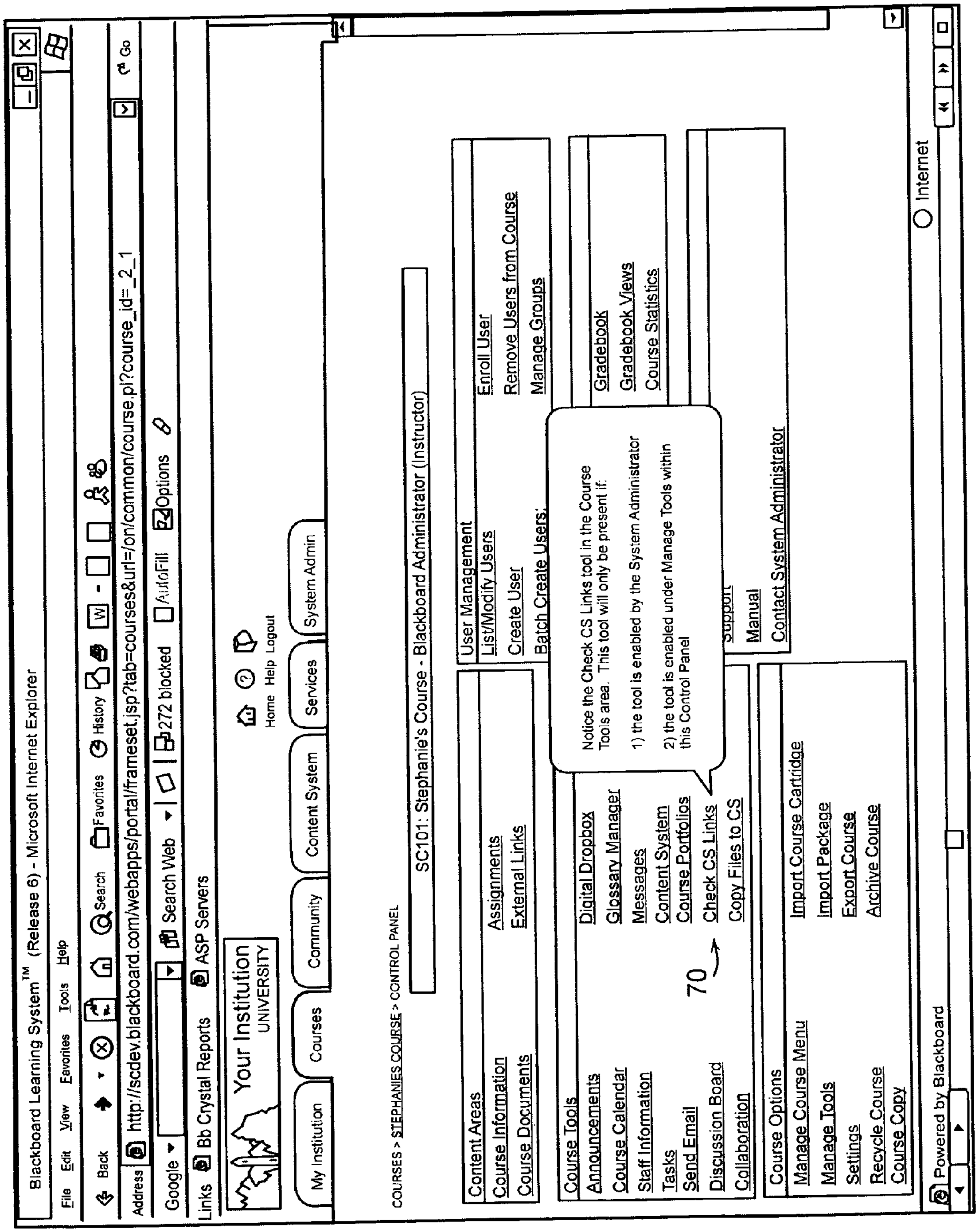
FIG. 20 is an exemplary screenshot illustrating a user home page.
Figure 21:
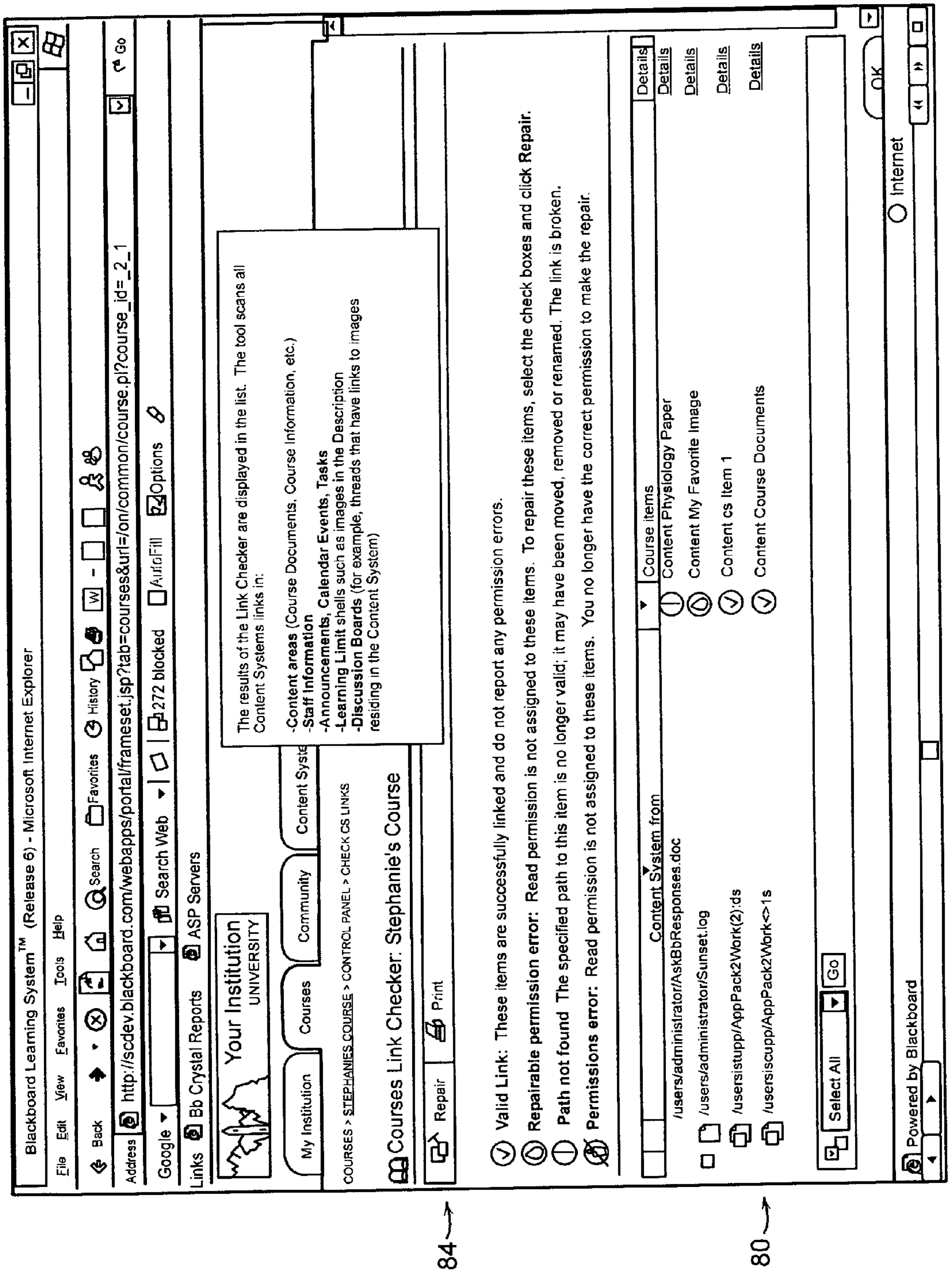
FIG. 21 is an exemplary screenshot illustrating link verification in accordance with one or more embodiments of the invention.
Figure 22:
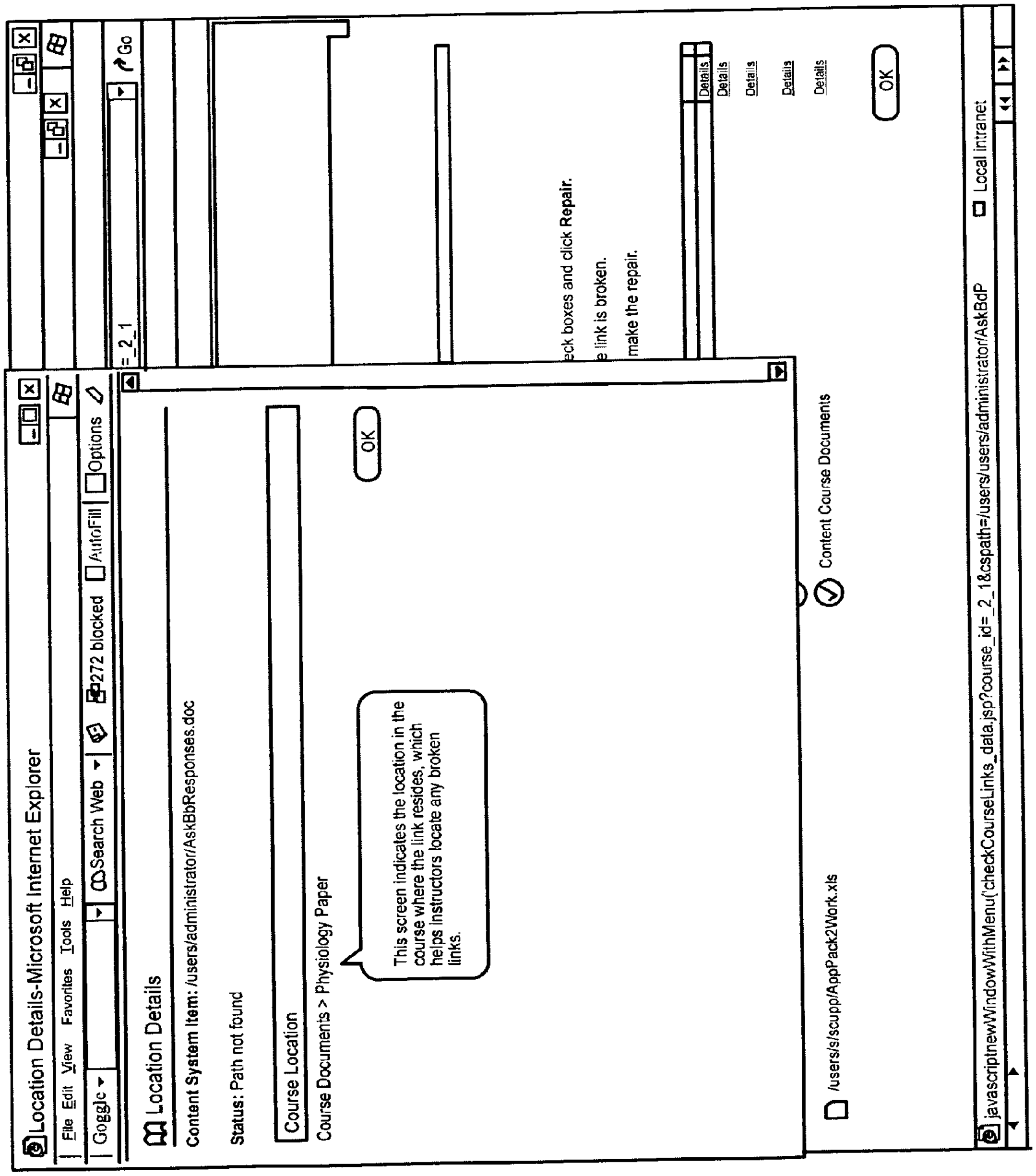
FIG. 22 is an exemplary screenshot illustrating link repair in accordance with one or more embodiments of the invention.

FIGS. 20-22 are sample screenshots illustrating one use case example of how a user can use a check links tool in accordance with one or more embodiments of the invention in the control panel of a course or organization. In these screenshots, pointer bubbles are used for annotation to provide further description about a particular item or action on the screen. Also, rectangular blocks are used to provide information about the scenario or background information used to describe the process.

FIG. 20 is a screenshot illustrating the course tools available to a user, including the check links tool shown at 70. This tool can be selected to verify links in a course to content items in the content system as illustrated in the screenshot of FIG. 21. The screenshot displays content items and the condition of their links at 80. The details buttons 82 can be selected to provide further details about the location of the links as illustrated in FIG. 22. The repair button 84 (shown in FIG. 21) can be selected to repair repairable links.

Various content system tools and features described herein are preferably implemented in software, and accordingly one of the preferred implementations of the invention is as a set of instructions (program code) in a code module resident in the random access memory of the computer. Until required by the computer, the set of instructions may be stored in another computer memory, e.g., in a hard disk drive, or in a removable memory such as, e.g., an optical disk (for eventual use in a CD ROM) or floppy disk (for eventual use in a floppy disk drive), or downloaded via the Internet or some other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to provide the specified functionality.

It should be noted that the various embodiments of the invention shown and described in this application are shown by way of illustration. As will be realized, the invention is capable of other and different embodiments and its several details may be capable of modifications in various respects, all without departing from the invention. Accordingly, the drawings and description herein are to be regarded as illustrative in nature and not in a restrictive or limiting sense.

The invention claimed is:

1. A system for providing data files to a community of users having different roles, said roles including student roles and instructor roles, said data files relating to a plurality of courses, at least some of said users being associated with one or more of said courses, the system comprising:

a common user interface connectable to a plurality of client devices respectively operated by said users; and a server system connected with said client devices, through said common user interface, the server system including a content system for creating, storing and sharing content items in a content repository from users having a student role and users having an instructor role, said content items in said content system being selectable by users having a student role and users having an instructor role for inclusion in one or more data files relating to courses with which said users are associated, the server system providing to said client devices access to data files relating to courses with which users operating said client devices are associated, wherein a user having a student role is selectably configurable to have access to creating, storing, and sharing content items in a storage area of the content repository designated for and limited to the user having the student role, and independently from a user having an instructor role, wherein the content system is configured to associate at least one of the content items with a plurality of courses, wherein the content system is configured to allow at least two of said users to edit and overwrite the same preexisting content item created by another user, and wherein at least one of the storage space or bandwidth for the storage area of the user differs based on whether the user has the student role or the user has the instructor role, and further based on at least one course with which the user is associated.

2. The system of claim 1 wherein said network comprises a LAN, a WAN, a MAN, an intranet or the Internet.

3. The system of claim 1 wherein said roles further include administrator roles, and librarian roles, and wherein a user having at least one of said administrator role and said librarian role is associated with an educational institution.

4. The system of claim 1 wherein users can search for desired content items in said content system using metadata associated with said content items or using text searching.

5. The system of claim 1 wherein said content items are organized in a catalog in said content system, and wherein users can identify desired content items in said content system by browsing said catalog.

6. The system of claim 1 wherein said content system controls which users can access said content items.

7. The system of claim 1 wherein said content system controls which users can access said content items based on permissions associated with said content items.

8. The system of claim 7 wherein said permissions include read, write, delete or manage.

9. The system of claim 1 wherein said content system controls the time period said content items can be accessed by said users.

10. The system of claim 1 wherein said content system provides a common structure for storage of said content items.

11. The system of claim 1 wherein the content system can manage file versioning.

12. The system of claim 1 wherein the content system can monitor the checking in and checking out of content items.

13. The system of claim 1 wherein the content system can be used as a workflow tool.

14. The system of claim 1 wherein the content items can be reused by users having an instructor role for multiple courses.

15. The system of claim 1 further comprising a link checker for verifying links in data files to content items stored in the content system.

16. The system of claim 1 wherein said content item is linked to said one or more of said plurality of data files.

17. The system of claim 1 wherein said content system has multi-language capability.

18. In a system for providing data files to a community of users having different roles, said roles including student roles and instructor roles, each user being associated with one or more of said courses, a method of storing and sharing content items from said users having a student role and users having an instructor role among a plurality of said data files, the method comprising:

identifying in a content repository for creating, sharing and storing content items from said users having a student role and users having an instructor role a desired content item to be used in one or more of said data files;

associating said desired content item with said one or more of said data files;

associating at least one of the content items with the plurality of courses within the content repository; and making said one or more data files accessible over a network to users associated with courses relating to said one or more data files, wherein a user having a student role is selectably configurable to have access to creating, storing, and sharing content items in a storage area of the content repository designated for and limited to the user having the student role, and independently from a user having an instructor role, wherein at least two of said users are allowed to edit and overwrite the same pre-existing content item created by another user, and wherein at least one of the storage space or bandwidth for the storage area of the user differs based on whether the user has the student role or the user has the instructor role, and further based on at least one course with which the user is associated.

19. The method of claim 18 wherein said network comprises a LAN, a WAN, a MAN, an intranet or the Internet.

20. The method of claim 18 wherein said roles further include administrator roles, and librarian roles, and wherein a user having at least one of said administrator role and said librarian role is associated with an educational institution.

21. The method of claim 18 wherein identifying a desired content item comprises searching for a desired content item in said content repository using metadata associated with said content items or using text searching.

22. The method of claim 18 wherein said content items are organized in a catalog, and wherein identifying a desired content item comprises browsing said catalog.

23. The method of claim 18 further comprising selectively controlling which users can access said content items.

24. The method of claim 23 wherein selectively controlling which users can access said content items is performed using permissions associated with said content items.

25. The method of claim 24 wherein said permissions include read, write, delete, or manage.

26. The method of claim 18 further comprising controlling the time period said content items can be accessed by said users.

27. The method of claim 18 wherein said content repository provides a common structure for storage of said content items.

28. The method of claim 18 further comprising managing file versioning of content items in said content repository.

29. The method of claim 18 further comprising monitoring the checking in and checking out of content items.

30. The method of claim 18 further comprising managing workflow activities relating to content items in said content repository.

31. The method of claim 18 further comprising storing user files in said content repository.

32. The method of claim 18 further comprising reusing content items stored in said content repository in multiple courses.

33. The method of claim 18 further comprising verifying links in data files to content items stored in the content repository.

34. The method of claim 18 wherein associating said desired content item with said one or more of said data files comprises linking said desired content item with said one or more of said data files.

35. A content system for use in sharing content items among a plurality of data files made accessible to a community of users having different roles, said roles including users having a student role and users having an instructor role, said data files relating to a plurality of courses, at least some of said users being associated with one or more of said courses, said content system comprising:

a content repository for creating, storing and sharing content items from users having a student role and users having an instructor role;

a search mechanism for assisting users having a student role to identify a desired content item in the content repository;

means for linking said desired content item with said one or more of said data files;

means for associating at least one of the content items with the plurality of courses within the content repository; and means for providing access to said one or more data files over a network to users associated with courses relating to said one or more data files, wherein a user having a student role is selectably configurable to have access to creating, storing, and sharing content items in a storage area of the content repository designated for and limited to the user having the student role, and independently from a user having an instructor role, wherein at least two of said users are allowed to edit and overwrite the same pre-existing content item created by another user, and wherein at least one of the storage space or bandwidth for the storage area of the user differs based on whether the user has the student role or the user has the instructor role, and further based on at least one course with which the user is associated.

36. The system of claim 35 wherein said network comprises a LAN, a WAN, a MAN, an intranet or the Internet.

37. The system of claim 35 wherein said roles comprise a student role, an instructor role, an administrator role, or a librarian role associated with an educational institution.

38. The system of claim 35 wherein users can search for desired content items in said content system using metadata associated with said content items or using text searching.

39. The system of claim 35 wherein said content items are organized in a catalog in said content system, and wherein users can identify desired content items in said content system by browsing said catalog.

40. The system of claim 35 wherein said means for providing access restricts which users can access said content items.

41. The system of claim 35 wherein said means for providing access controls the time period said content items can be accessed by said users.

42. The system of claim 35 wherein said content system provides a common structure for storage of said content items.

43. The system of claim 35 wherein the content system can manage file versioning.

44. The system of claim 35 wherein the content system can monitor the checking in and checking out of content items.

45. The system of claim 35 wherein the content system can be used as a workflow tool.

46. The system of claim 35 wherein said content system has multi-language capability.

47. The system of claim 35 further comprising a link checker for verifying links in data files to content items stored in the content system.

* * * * *